June 14, 1960 — H. H. CARY — 2,940,355
RAMAN SPECTROPHOTOMETER
Filed March 2, 1956 — 5 Sheets-Sheet 1
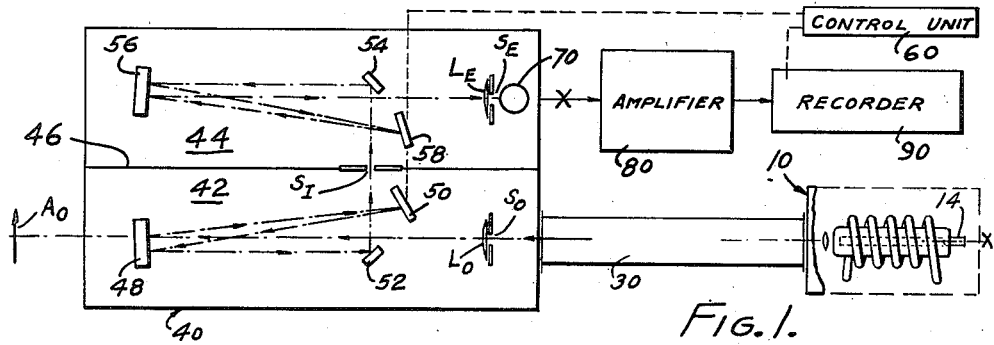
Fig. 1.
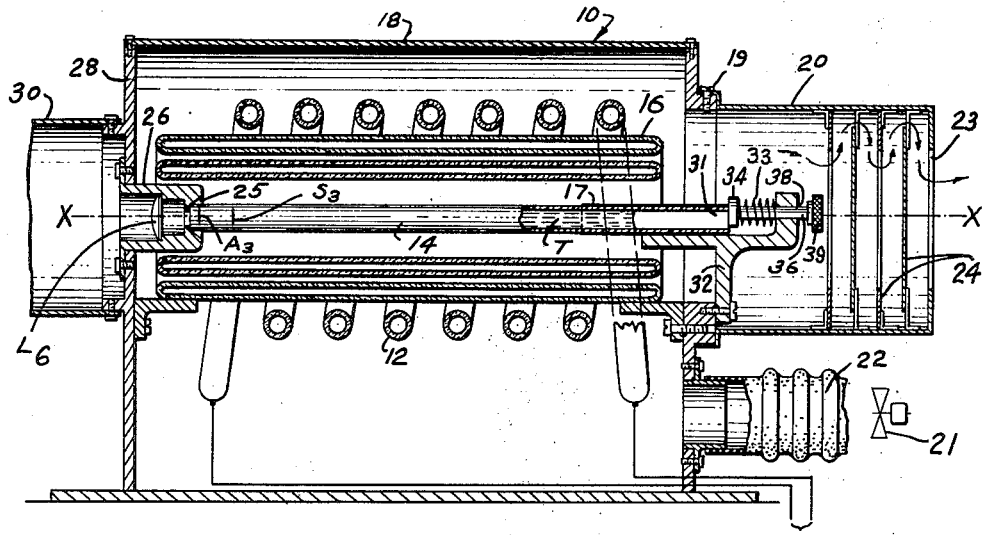
Fig. 3.
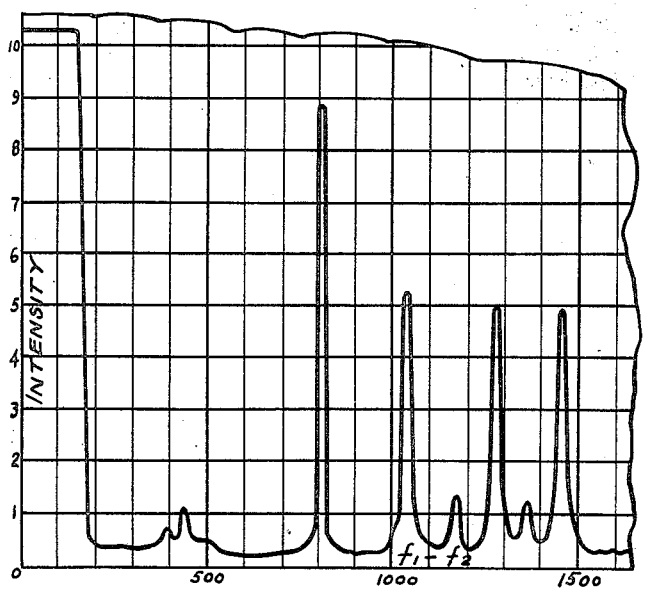
Fig. 2.
INVENTOR.
HENRY H. CARY
BY
ATTORNEY

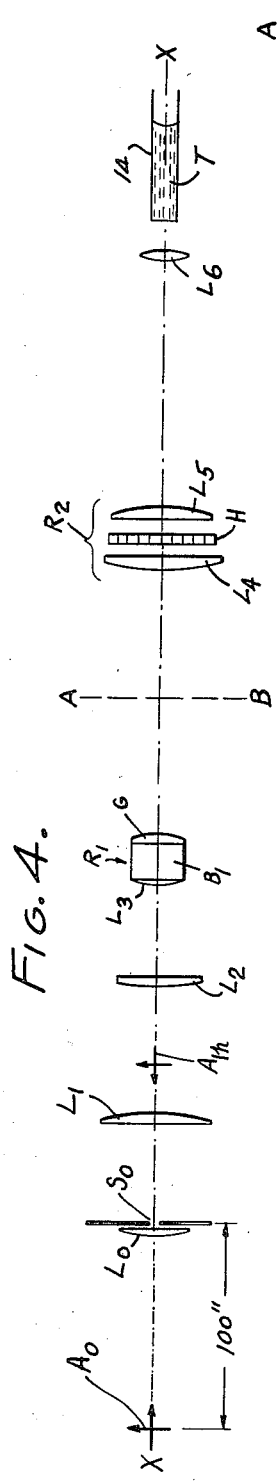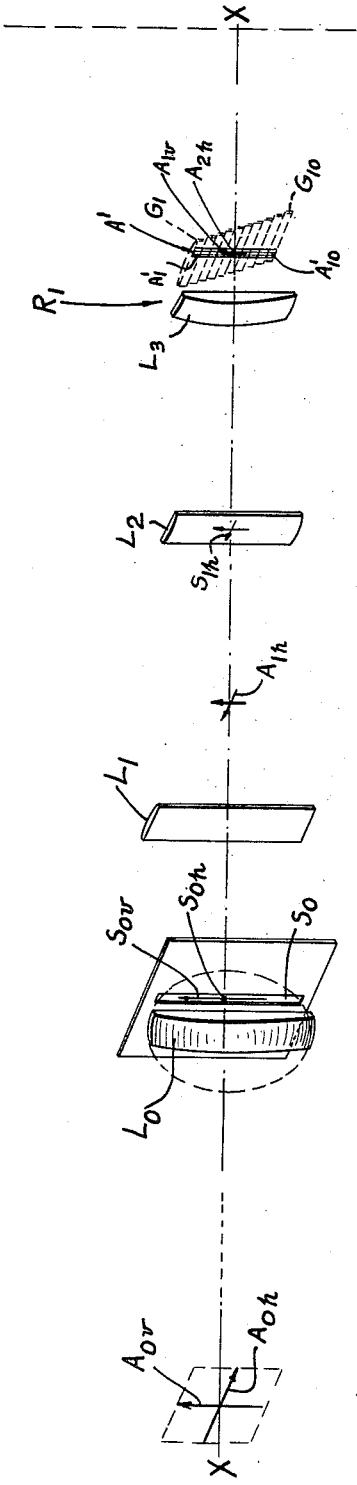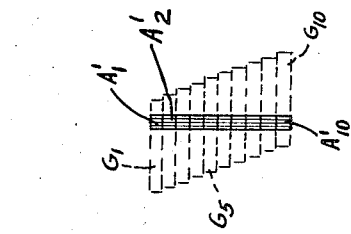

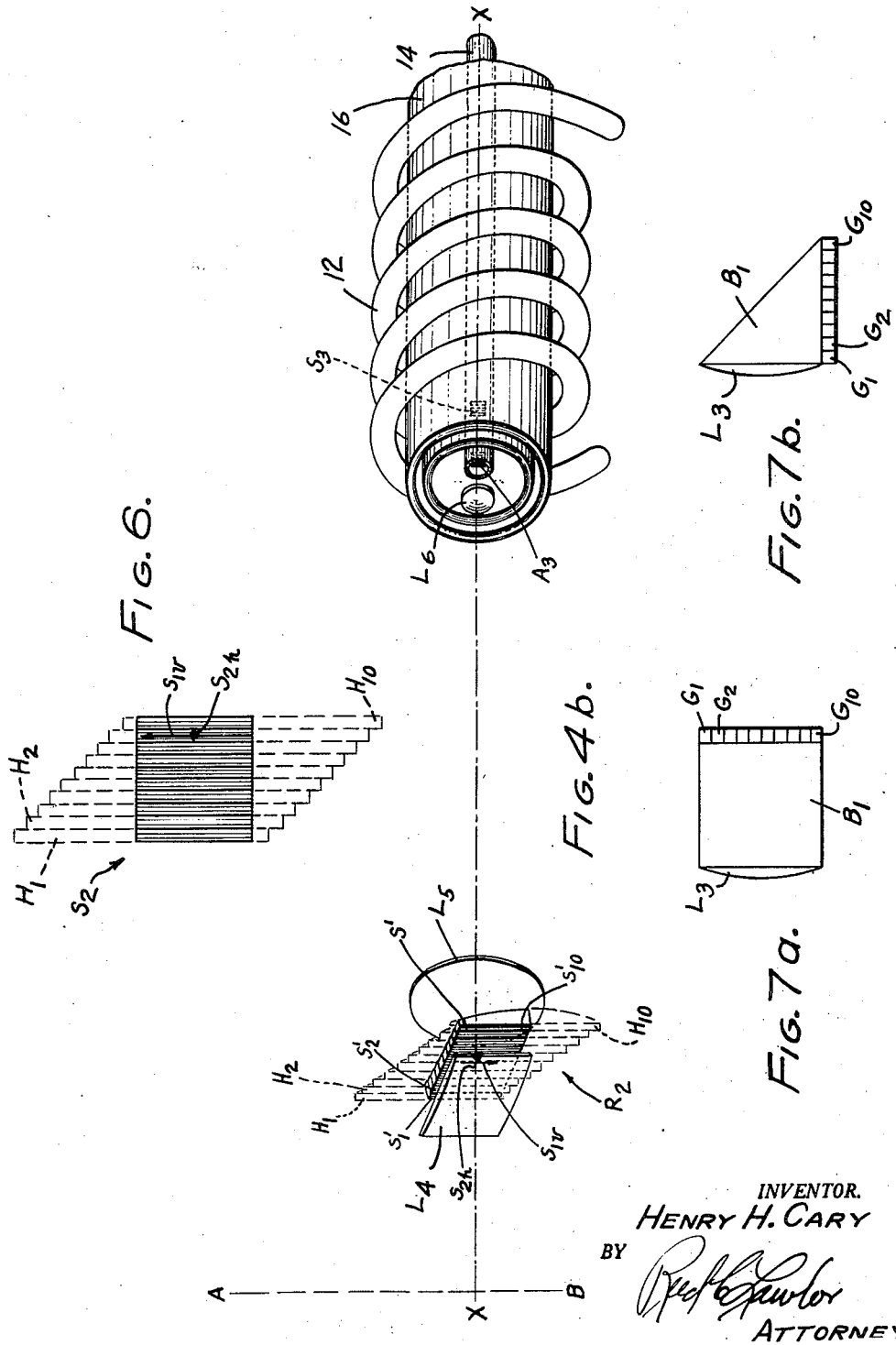

June 14, 1960 H. H. CARY 2,940,355
RAMAN SPECTROPHOTOMETER
Filed March 2, 1956 5 Sheets-Sheet 4

INVENTOR.
HENRY H. CARY
BY
ATTORNEY

June 14, 1960  H. H. CARY  2,940,355
RAMAN SPECTROPHOTOMETER
Filed March 2, 1956  5 Sheets-Sheet 5

INVENTOR.
HENRY H. CARY
BY
ATTORNEY

2,940,355
RAMAN SPECTROPHOTOMETER

Henry H. Cary, Alhambra, Calif., assignor to Applied Physics Corporation, Monrovia, Calif., a corporation of California Filed Mar. 2, 1956, Ser. No. 569,177

14 Claims. (Cl. 88—14)

This invention relates to improvements in spectroscopy and more particularly to improvements in Raman spectroscopy.

Numerous spectroscopic systems are employed in the analysis of various substances, whether they be atomic or molecular and whether they be in the form of gas, liquid, or solid. Raman spectrometers have found particular use in the study of molecular liquids. Raman spectroscopy is often more effective in the determination of molecular structure and in the analysis of molecular mixtures than other spectroscopic techniques, particularly because the lines of a Raman spectrum are comparatively sharp and also because the number of lines present in a Raman spectrum is often lower than the number of lines occurring in other types of spectra that might be employed in the analysis of molecular compositions and also because the band of frequencies of a Raman spectrum lies within a narrower octave range.

Raman spectra occur when light is scattered by matter. At the same time, scattering of other types also usually occurs. Radiation due to such other scattering tends to obscure or mask the Raman spectra. Due to the fact that the scattering process whereby Raman spectra are produced is so inefficient, and also due to the fact that other types of scattering occur when Raman spetra are produced, the detection and analysis of Raman spectra is very difficult.

To appreciate this difficulty, consider now the scattering process in more detail and assume for example that it is desirable to detect the Raman spectrum of a liquid sample contained in a glass cell. In the production of Raman spectra, a source of substantially monochromatic exciting radiation is generally employed.

Scattering of the type that arises because of the recoil of photons that collide with molecules in a homogeneous medium, is known as Rayleigh scattering. The energy of the scattered photons, in this case, is very nearly equal to the energy of the colliding or incident photons. For this reason, very little change in wavelength occurs in Rayleigh scattering. Scattering that arises because of the presence of motes in a liquid or gas is known as Tyndall scattering. No substantial change in wavelength occurs in Tyndall scattering. Similarly, scratches and other small irregularities in or on the cell walls also produce scattering without change in wavelength.

The Raman scattering process is of an entirely different kind from either the Rayleigh or the Tyndall scattering process. In the Raman process, photons of exciting radiation are absorbed by molecules or otherwise interact with them in such a way that a quantized exchange of energy occurs. In any event, after the interaction has occurred the energy of the photon is altered, either being increased or decreased by amounts that correspond to certain differences in the energy levels characteristic of the molecule. Assume, for example, that the frequency of the exciting radiation is $f_1$ and that a frequency corresponding to a specific difference of energy levels of the molecule involved in the interaction is $f_0$, then if such interaction occurs, the photon that is emitted from the molecule has a different energy corresponding to a different frequency $f_2$. Thus, the interaction may result in the change of energy of the indicent photon $hf_1$ to an energy $hf_2$ of the emitted photon expressed by the following equation:

$$hf_2 = hf_1 \pm hf_0$$

The plus sign is employed when the incident photon absorbs energy from the molecule and the minus sign is employed when the incident photon loses energy to the molecule. From this expression, it is apparent that a spectrum that is characteristic of the molecule can be ascertained in terms of the differences in the frequencies $(f_2)$ of various Raman lines and the frequency $(f_1)$ of the exciting radiation. In view of the fact that the energy levels of a molecule are quantized, these frequency differences have a series of discrete values which characterize the different Raman lines. It is to be noted that the Raman lines do not have any fixed frequencies, but that their frequencies depend upon the frequency of the exciting radiation. However, the difference between the frequency of each Raman line and the frequency of exciting radiation is independent of the frequency of the exciting radiation.

Generally speaking, the frequency differences that are thus characteristic of Raman lines are the same as the frequencies of lines that appear in the infra-red absorption spectrum or emission spectrum of the same molecules. However, the frequencies characteristic of the absorption or emission spectra are in effect added to or subtracted from the frequency of the exciting radiation. Furthermore, the frequency of the exciting radiation employed in Raman spectroscopy is high compared with the frequencies present in the infra-red spectra of the molecules subjected to such excitation. For these reasons, the spread of frequencies of a Raman spectrum expressed on an octave basis is less than the spread of frequencies of an absorption or emission spectrum. This fact alone makes it advantageous to employ Raman spectroscopy rather than infra-red spectroscopy in the analysis of molecular compositions, since by the use of Raman spectra produced when the exciting radiation has a short wavelength such as the wavelength of blue, or ultra-violet light, an entire Raman spectrum occurs over a range less than one octave, whereas the corresponding infra-red absorption or emission spectrum occurs over a range that greatly exceeds one octave. By virtue of the reduced frequency range produced it becomes a simple matter to observe the various lines of a Raman spectrum with a single dispersing element, whether it be a prism or a grating.

Not all infra-red lines have their counterpart in Raman spectra and not all Raman lines have their counterpart in infra-red spectra. Generally speaking, though, Raman spectra are simpler than infra-red spectra of the same molecules.

Another advantage of Raman spectroscopy resides in the fact that by employing excitation radiation of the proper frequency, the Raman spectrum lines are caused to fall in the visible or near ultra-violet spectral regions for which there exist exceptionally efficient photodetectors and optical elements.

Fluorescence spectra also appeared in scattering processes. In fluorescence, an incident photon is absorbed by a molecule. At a later time, the excited molecule which has previously absorbed such a photon falls to a lower energy state, thereby emitting a photon. If a molecule returns to the same state that it was in prior to the absorption of the photon, the fluorescent radiation emitted will have the same frequency as the exciting radiation. However, if, as is more usual, the molecule enters a different energy state, then the fluorescent radiation emitted has a different frequency. In order for fluorescence to occur, the exciting photon itself must have an energy corresponding to a "permitted" change of energy characteristic of the molecule. In contrast, the Raman effect occurs irrespective of the frequency of the radiation.

Another advantage of employing Raman spectroscopy compared with infra-red spectroscopy lies in the fact that the intensity of the Raman spectrum of each molecular species of a mixture is ordinarily proportional to the concentration of that species in a mixture. This fact simplifies the quantitative analysis of mixtures. This simplification does not ordinarily exist in infra-red absorption spectroscopy.

For the foregoing reasons and others, it is apparent that Raman spectroscopy is really an important instrument for research, whether it be pure research or industrial research. Raman spectroscopy is also important in industrial applications where it is desirable to analyze molecular mixtures and to control the processes by which they are formed. According to the present invention, a Raman spectrophotometer of increased sensitivity is provided.

In the past, one of the limitations on the sensitivity attainable in Raman spectroscopy arose from the fact that care was always exercised to avoid transmitting to the monochromator any radiation that is emitted from or scattered by the walls of the sample chamber such as by fluoroescence or Tyndall scattering. In the past, in order to achieve that goal, a tubular sample chamber having an opaque curved "horn" at the open end was employed for holding a sample. (See, for example, "Practical Spectroscopy" by Harrison, Lord, and Loofburow, page 509, Prentice Hall, 1948). Exciting radiation entered the sample laterally through the part of the tubular member that was not so coated. In addition, the optical system was so designed that two aperture stop images were formed in the exposed part of the sample, one aperture stop image being located near the closed end of the sample, and the other aperture stop image being located adjacent the edge of the opaque coating, and such aperture stop images were formed in the cross-sectional area of the sample within the sample tube. In this way, the only radiation transmitted to the monochromator was that which originated in the liquid sample and all of the radiation originating in the body of the cell wall or at its surfaces was excluded from the monochromator. In this connection, it is to be noted that the curved end or horn of the tube was curved sufficiently far to trap exciting radiation that was transmitted or scattered in its direction and thus preventing it from entering the spectrometer.

According to the present invention, the sample is illuminated with exciting radiation over an extended region thereof far beyond that illuminated in prior art systems. In particular, the sample is illuminated over a region sufficiently long to enable many reflections to occur along the path of travel of radiation which is transmitted to the monochromator. Unlike former systems, in the Raman spectrophotometer of my invention, the monochromator thus "sees" the walls of the sample chamber. By virtue of this fact, the intensity of the Raman spectrum transmitted to the monochromator is increased since the intensity of the Raman spectrum is proportional to the length of the sample tube illuminated by the exciting radiation. At the same time, a background of undesired radiation emitted from the walls of the sample cell is also transmitted to the monochromator.

I have discovered that the effects of this background radiation can be greatly reduced and often substantially eliminated by employing a double monochromator to disperse the radiation emerging from the sample cell. Thus, in my invention, a double monochromator is employed to reduce the intensity of undesired or background radiation compared with the intensity of the spectral lines being measured. Such a monochromator reduces the intensity of the undesired radiation in several ways. First of all, it provides a monochromator of high resolving power to facilitate the separation of the lines of the Raman spectrum from the line representing the exciting radiation. But more important, the use of the second section in the double monochromator greatly reduces the intensity of any background radiation that enters the entrance slit and is transmitted to the exit slit of the first section of the monochromator because of scattering in the first section.

In practice, I have found that the background radiation that enters the monochromator from the sample cell is due primarily to the scattering of exciting radiation from the sample and from the walls of the sample chamber. In effect, the background radiation consists of a feeble background of "white light" and a strong component of the exciting radiation. In accordance with this invention, the scattered exciting radiation that reaches the exit slit as the spectrum is scanned is greatly attenuated by the use of a double monochromator, leaving a small residual background spectrum upon which the Raman spectrum from the sample is superposed. For this reason, my invention makes advantageous use of a sample which extends over a region through which the monochromator "sees" the walls of the sample chamber. In order further to increase the effectiveness of my invention, a double monochromator of the type that employs gratings as dispersing elements is used. Such a double-grating monochromator may be readily rendered substantially free of ghost transmission from the entrance slit to the exit slit. Even though some residual scattered radiation is transmitted from the entrance slit to the exit slit of the double monochromator by multiply-deflected paths, such residual scattered radiation is very feeble, thus making it possible to detect Raman radiation from small samples.

By making it possible to utilize radiation from a longer sample length and from a wider portion of a cylindrical sample tube in accordance with this invention, the sensitivity of the Raman spectrograph embodying the invention is greatly increased. For this reason, this invention may be employed to determine the Raman spectra of much smaller samples than could be effectively employed heretofore.

To achieve such increase in sensitivity, radiation emerging from the end of a tubular sample cell of a Raman spectrophotometer is utilized over a larger portion of the cross-sectional area of the cell and radiation is also utilized from a longer length of the cell. In addition, some other features are employed to accomplish this improvement. In order to understand how a larger portion of the cross-sectional area of the sample is utilized, it is necessary to recall that in any monochromator the limits of the useful beam are defined by two aperture stops. One of these aperture stops is normally formed by the entrance slit and the other is normally defined by the limits of the dispersing element, or the edges of a mask adjacent thereto. The heights and widths of these two aperture stops and the distance between them define in effect a vertical and a horizontal Lagrange constant. In the past, in Raman spectroscopy, an image of the entrance slit which was usually very narrow and an image of the other aperture stop, which was usually about square, were formed within the sample cell, thus forming a truncated pyramidal sample region that was square at one end and was rectangular at the other. In such a system, the only Raman radiation that was utilized in the monochromator was that which emerged from the parts of the sample that were located within the pyramidal sample region. Radiation emerging along rays passing alongside the narrow entrance slit image is lost even though it passes through the other aperture stop image. This results in an inefficient use of the sample.

The fact that only such a pyramidal sample region could be employed, was necessitated by the fact that it was generally implicitly assumed that the maximum vertical Lagrange aperture constant of the beam in the sample region had to be equal to the maximum vertical Lagrange aperture constant of the beam in the monochromator and that the maximum horizontal Lagrange aperture constant of the beam in the sample region had to be equal to the maximum horizontal Lagrange aperture constant of the beam in the monochromator. One important feature of this invention takes into account the fact that this assumption is false and that the maximum Lagrange aperture constants of a beam in the vertical and horizontal planes in the monochromator are unequal. I have found that by forming aperture stop images at each end of the sample cell which are of the same shape and size and are non-reentrant, a sample having a volume of minimum size may be used without introducing transmission of radiation from the walls of the sample cell directly to the monochromator. By non-reentrant, I mean that no straight line connecting any two points of any one of the aperture stop images intersects the boundary of the sample cell between those points. Such aperture stop images may be simple, composite, or superimposed as will be illustrated and discussed in more detail hereinafter. The most suitable shape for such an aperture stop image is square. Furthermore, such a square image is easily accommodated within a cell having a circular cross-section. Such circular cross-section cells, it will be understood, are relatively inexpensive and are commonly used for optical purposes. But where radiation from the cell walls can be tolerated, maximum efficiency can be achieved by employing one square aperture stop image at the end of the sample and a larger aperture stop image at a great distance therefrom. For brevity the term Lagrange constant is frequently used herein as a synonym for Lagrange aperture constant.

In accordance with this invention, I employ, what I call, a Lagrange-constant transformer between the sample cell and the monochromator, thus making it possible to employ a sample region having equal maximum horizontal and vertical Lagrange aperture constants even though the maximum vertical Lagrange aperture constant in the monochromator is much greater than the horizontal Lagrange aperture constant in the monochromator. In a specific embodiment of the invention described hereinafter, the use of such a Lagrange-constant transformer makes it possible to form in effect square images of both aperture stops of the monochromator in the sample region. Thus, with this arrangement, by locating such aperture stop images at spaced apart points in a cell of circular cross-section, a smaller sample may be employed to produce a Raman spectrum of any specific intensity.

The Lagrange-constant transformer that is specifically described herein employs two image slicers. In one form of the invention, the first, or horizontal, image slicer in effect optically slices an image of the aperture stop associated with the dispersing element of the monochromator into a first series of zones of equal height and width. In other words, this image is divided along uniformly spaced parallel horizontal planes. The second or vertical image slicer optically slices another image corresponding to the entrance slit into a second series of zones of equal width, each of which constitutes a different image of the entrance slit. Looked at another way, by the action of the first image slicer, a set of adjacent images of the aperture stop formed by the entrance slit of the monochromator falls on the second, or vertical, image slicer, constituting a composite image of the slit. In a specific embodiment of the invention, the individual zones at the first image slicer are square and the composite image at the second image slicer is square. However, this relationship is not essential to all forms of the invention.

Various parts of the first slicer cause each of the adjacent slit images to fall upon a different part of the second image slicer. The corresponding parts of the two image slicers cooperate in such a way that all of the first series of zones are brought to focus at one square aperture stop image in the sample region and that the other series of zones are brought to a focus in side by side relationship extending over another square aperture stop image in the sample region. The rectangular zones formed by the first or horizontal image slicer are elongated horizontally while those formed at the entrance slit by the second image slicer are elongated vertically.

In one system, the number of zones formed by one slicer is equal to the number of zones formed by the other slicer. Each of the zones at one slicer corresponds to one and one only of the zones at the other slicer and the system is so arranged that radiation traveling through any zone at one slicer also travels only through a corresponding zone at the other slicer.

Each of the image slicers employed in the Lagrange constant transformers of the embodiments of the invention specifically disclosed herein comprises a plurality of identical segments which are cut from a cylindrical lens. The segments of each slicer are displaced relative to each other transversely of the optical axis of the system and of the axis of the cylinders and they are cemented together and to a transparent support member thus forming a rigid unitary structure. These segments deflect rays passing through corresponding zones to produce the desired super position of sliced images of the grating aperture stop in the sample and the desired side-by-side disposition of images of the entrance slit at another aperture stop image in the sample region.

In the past, image slicers have been employed in a number of ways to increase the sensitivity of a spectrometer. One such system is disclosed in an article published by Dr. I. S. Bowen in the Astrophysical Journal, vol. 88, page 113 (1938). In Dr. Bowen's system, a single image slicer was employed to slice the image of a distant star into a series of segments which were then stacked one above another in a linear array at the entrance slit of a spectrograph. In this arrangement, the slicing and stacking was accomplished in part by a plurality of mirrors arranged in echelon fashion and tilted with respect to the path of transmission of the radiation. Such a system is effective only when the angle of the received beam is very small.

Another type of image slicer has been described by Dr. William Benesch and Dr. John Strong in the Journal of the Optical Society of America, volume 41, page 252 (1951). In the Benesch and Strong system, a single image slicer was employed to slice an image of the sun into a number of segments and these segments were then projected through an equal number of vertically spaced sections of the entrance slit of a spectrograph. In this system, the sets of elements that achieve the slicing and rearrangement of the image parts are in the form of spherical mirrors. These mirrors are difficult to mount and to adjust.

In both of these prior art systems, slicing is performed only with respect to one aperture stop, namely, the aperture stop at which the image of the star or the sun, as the case may be, was formed. But in accordance with the present invention, as indicated above, image slicing is produced with respect to two aperture stops or their images.

This invention possesses many other advantages and has other objects which will become apparent from a consideration of two embodiments of the invention. To this end, two forms of the invention are illustrated in the drawings that accompany and form part of the present specification. These forms of the invention will now be described in detail to illustrate how the principles of the invention are applied. It is to be understood, however, that the detailed description and the drawings are provided only to illustrate the invention and that the invention is not limited to such details, but that the scope of the invention is defined by the appended claims.

Figure 1 is a schematic diagram of a Raman spectrophotometer employing a single-slit monochromator and embodying this invention;

Fig. 2 represents a Raman spectrogram of the type obtained with the Raman spectrophotometer of this invention;

Fig. 3 is a vertical sectional view of the source unit of the Raman spectrophotometer of Fig. 1;

Fig. 4 is a plan view of an optical layout showing the relative positions of the various parts of the entrance system of the spectrophotometer;

Figs. 4a and 4b are isometric views of parts of the entrance system;

Fig. 5 is a vertical cross-sectional view of the horizontal image slicer as viewed along the optic axis;

Fig. 6 is a vertical cross-sectional view of the vertical image slicer as viewed looking toward the sample along the optic axis;

Fig. 7a is a side elevational view of one form of the first image slicer;

Fig. 7b is a side elevational view of another form of the first image slicer;

Figure 8:
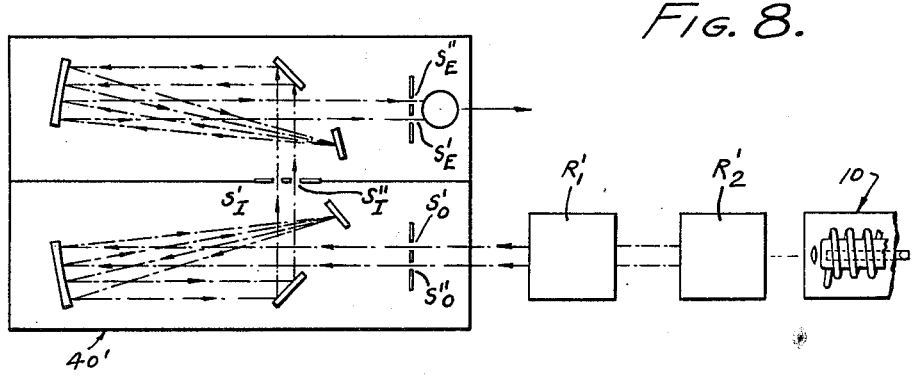
Fig. 8 is a schematic diagram of a Raman spectrophotometer employing a twin-slit monochromator and embodying this invention.

In the Raman spectrophotometer illustrated in Figure 1 and embodying the invention, scattered radiation emerging from a source unit 10 along the optic axis X—X is transmitted through a Lagrange-constant transformer unit 30 through an entrance slit $S_O$ into a double grating monochromator 40. Monochromatic radiation emerging from the exit slit $S_E$ of the monochromator 40 strikes a photocell 70. Currents generated by the photocell 70 in proportion to the intensity of radiation transmitted thereto by the monochromator, are amplified by means of an amplifier 80 and then applied to an automatic recorder 90 in which a spectrogram of the Raman spectrum emitted from the sample in the source unit is recorded. In this spectrophotometer, the image converter unit 30 that includes a Lagrange-constant transformer is employed to convert a beam having substantially square cross-section throughout the sample to a beam which is tall and narrow in part and which may therefore conform to the shape of the entrance slit $S_O$. By using such an image converter unit, it becomes possible to employ very small Raman cells which are circular or square in cross-section in the source unit, and thus to measure or record a Raman spectrum of a sample even though only a very small quantity of that sample is available for analysis.

The system is characterized by two principal planes. One pricipal plane, which includes the optic axis, is vertical. The other principal plane is horizontal. The heights of the slits $S_O$, $S_I$ and $S_E$ are parallel to the vertical principal plane, while the widths are parallel to the other. While the invention is described with reference to only one orientation of the principal planes relative to horizontal and vertical planes, other orientations are possible.

THE MONOCHROMATOR

The two monochromator sections 42 and 44 are of similar construction and are on opposite sides of a central wall 46. An intermediate slit $S_I$ located in wall 46 serves as the exit slit for the monochromator section 42 and as the entrance slit of the second monochromator section 44. Heterochromatic radiation that is transmitted from the source unit 10 through the entrance slit $S_O$ impinges upon a collimating mirror 48 which deflects the radiation as a collimated beam to a first grating 50. Heterochromatic radiation diffracted by the grating 50 returns to the collimating mirror 48 which reflects the radiation to a mirror 52 which in turn reflects the radiation to the plane of the intermediate slit $S_I$ where radiation of different wavelengths is brought to focus at different points by the collimating mirror 48. Monochromatic radiation selected by and passing through the intermediate slit $S_I$ is reflected by a mirror 54 toward a collimating mirror 56 which reflects the radiation as a collimated beam toward a second diffraction grating 58. Monochromatic radiation of the selected wavelength and diffracted by the grating 58 is returned to the collimating mirror 56 which focuses this monochromatic radiation at the exit slit $S_E$.

In the double monochromator illustrated, each monochromator section is of the Littrow type in which a single collimating element is employed to transmit radiation toward the corresponding grating and to receive radiation diffracted therefrom. In this double monochromator, the two gratings are inclined asymmetrically with respect to the beam even though the paths are symmetrical. With this arrangement, the dispersions produced by the two gratings add, thereby increasing the overall dispersion of the monochromator and aiding in achieving high resolving power.

The two gratings 50 and 58 may be in the form of identical replica gratings. Their faces are vertical and they are so mounted relative to the vertical principal plane that both monochromator sections 42 and 44 are capable of transmitting monochromatic radiation of the same wavelength therethrough. Both gratings are mounted on the same rotatable frame and at such angles that the normals to both gratings are always inclined at the same angles with respect to the collimated beams incident thereon.

Each of the gratings has a useful aperture that is about square and is about 10 cm. on each side and each grating is ruled with 12,000 lines/cm. and is blazed for 4500 A. in the first order. The two gratings are rotated in unison by means of a control unit 60 so as to vary the wavelength of the monochromatic radiation emerging from the exit slit $S_E$. The control unit 60 is also employed to drive a strip of recording paper in the recorder 80 while the Raman spectrum is being scanned so as to produce a Raman spectrogram of the type in which abscissae represent frequency and ordinates represent beam intensity. A section of such a spectrogram is illustrated in Fig. 2. In this spectrogram, the intensity (I) of radiation received by the photocell as the spectrum is scanned is plotted as a function of the frequency differential $f_1 - f_2$ where $f_1$ is the frequency of the exciting radiation and $f_2$ is the frequency of the Raman radiation.

THE SOURCE UNIT

As indicated in Fig. 3 the source unit 10 comprises a helical gaseous discharge tube 12 mounted around and co-axially with a capillary sample tube 14 that is of circular cross-section and which is removably supported along the central axis X—X. A filter in the form of a plurality of annular vessels 16 is mounted between the helical tube 12 and the capillary tube 14 and concentrically therewith. The helical tube 12 and the filter vessel 16 are removably mounted within a housing 18 which is provided with a removable baffle 20 at one end thereof.

Air pumped through the housing by means of a fan 21 through an inlet 22 exits from the baffle unit 20. This air serves to cool the helical tube 12, the filter vessels 16, and the sample tube 14. The baffle plates 24 are arranged transverse to the opening 23 at the outer end of the baffle unit 20 so as to permit free flow of cooling air therethrough without however permitting external radiation to be transmitted inwardly of the opening 23 except in greatly attenuated form by devious multiple paths past the black baffle plates. The baffle unit 20 and the surfaces of the baffle plates 24 are coated with light-absorbing material such as black paint so as to minimize the amount of radiation transmitted by the baffle unit 20. However, the interior surface of the housing 18 is coated with a highly reflective material such as aluminum paint to increase the amount of exciting radiation passing into the sample cell. The baffle unit 20 is made removable so as to facilitate installation and removal of sample cells and is normally held in place by means of a screw 19.

The sample cell 14 is in the form of a straight capillary tube that is normally closed at one end and open at the other. The closed end is supported in a conical aperture 25 of a tubular support member 26 removably mounted on the inner wall 28 of the housing 18. The open end 31 of the sample tube rests on a support arm 32. The sample tube is held in place and its closed end is pressed into the conical aperture 25 by means of a spring 33 acting on a circular disc 34 mounted at the inner end of a rod 36 that is slidably arranged in a passage 38 of the support arm 32. The rod 38 is provided with a knurled knob 40 at its outer end to facilitate installation and removal of sample cells.

The tube 12 is in the form of a low pressure mercury lamp that is energized by means of electrical power supplied from an external source. As is well known, such a mercury lamp emits a line spectrum consisting of many monochromatic lines. The filter vessels 16 contain fluids of a suitable type to transmit to the sample cell 14 substantially monochromatic radiation emitted by the mercury vapor lamp. In the filtering action some absorption due to the walls of the vessels 16 also occurs and aids in the filter action. In a specific embodiment of the invention which has been employed use has been made of the Hg lines near 4358 A. Hg as exciting radiation.

In order to reduce confusion and annoyance that would arise if two Raman spectra caused by two or more monochromatic exciting lines were superposed, the filter 16 is made up of two sections, one containing a sodium nitrite solution and the other containing a cupric ammonium sulfate solution. Such a filter confines the exciting radiation transmitted from the mercury lamp 12 to the sample cell 14 to the mercury lines having the wavelength near 4358 A., where the chief component has the wavelength of 4358.35 A.

When such monochromatic exciting radiation strikes molecules of a sample contained in the sample cell 14, it is scattered in all directions. Due to the Raman effect, parts of the scattered radiation have a different wavelength from that of the exciting radiation. Such scattered radiation, as explained above, is quantized in accordance with the energy levels of the scattering molecules. However, as a result of Tyndall or other scattering some of the scattered radiation is of the same or nearly the same wavelength as the exciting radiation. The intensity of the Raman radiation is very small compared to the intensity of other scattered radiation. In this invention, scattered radiation of both types is transmitted to the monochromator and a Lagrange-constant transformer is employed to increase the efficiency with which the Raman radiation is transmitted into the entrance slit 50 and through the monochromator 40 to the photocell 70. The manner in which the scattered radiation is transmitted from the closed end of the sample cell 14 to the entrance slit $S_O$ of the monochromator is explained in detail below.

LAGRANGE—CONSTANT TRANSFORMER UNIT

In the Raman spectrophotometer of Fig. 1, scattered radiation which is transmitted through square aperture stop images $A_3$ and $S_3$ within the tube 14 is focused as an elongated image at the entrance slit $S_O$ of the monochromator. In order to trace the paths along which the rays travel from the sample tube through the monochromator, it is sometimes convenient to trace the paths in the reverse direction. Such a reverse type of analysis is permissible because of the reversibility or reciprocity relationship which applies to the geometrical optics properties of the system.

To trace the rays in the reverse direction, assume that radiation enters the exit slit $S_E$ and travels along certain paths adjacent to the optic axis X—X, striking the following elements in the order mentioned: collimating mirror 56, the reflecting mirror 54, the intermediate slit $S_I$, the reflecting mirror 52, the collimating mirror 48, the diffraction grating 50, the collimating mirror 48, and then the entrance slit $S_O$ and that the rays then travel through the Lagrange transformer unit 30 to the sample cell 14. In the passage of rays through the monochromator the diffraction grating 50 carries an interior aperture stop which defines the lateral limits of the beam at the grating. In the particular system described herein, it is assumed that the aperture stop of the monochromator is defined by the face of the diffraction grating 50 or by means of a mask mounted on it. In the following description, however, the aperture stop referred to is the apparent or virtual aperture stop defined by the virtual image $A_O$ of the diffraction grating 50 that is formed by the collimating mirror 48 on the opposite side thereof from the entrance slit $S_O$. For convenience in explaining the invention, it is assumed that the apparent aperture stop is nearly square having an aspect ratio near unity, even though in practice the aperture stop departs somewhat from a square shape and even changes in size and shape somewhat as the wavelength of the radiation transmitted through the monochromator is altered.

The relative positions of the virtual image $A_O$ and the entrance slit $S_O$ together with the relative positions of parts of the Lagrange-constant transformer unit and the sample system are indicated in Fig. 4 and in Figs. 4a and 4b.

The relative positions of the various parts of the optical system and their most important optical characteristics are summarized in Table I, where each element or image is identified in the first column, its distance D from the entrance slit $S_O$ is indicated in the second column, its horizontal dimension or characteristic h in the horizontal principal plane is indicated in the fourth column and its vertical dimension or characteristic v in the vertical principal plane is indicated in the fifth column. Horizontal dimensions of images, slits, and the like are thus listed under the fourth column, while vertical dimensions of images and apertures are indicated in the fifth column. Focal lengths of elements in a horizontal plane are also thus listed in the fourth column, while focal lengths in the vertical plane are tabulated in the fifth column. In the sixth column, the thickness t of the respective lenses along the optic axis X—X is indicated.

The various elements or images are listed in Table I consecutively in the order that they lie along the optic axis X—X. Distances ΔD between successive elements or images are listed in the third column. Where the position of a lens is indicated, it is to be understood that the measurement is to be made from the Gaussian or unit plane of the lens. Distances along the optic axis X—X and focal lengths stated in inches ("),while dimensions, such as image widths and the like, transverse to the optic axis are stated in millimeters (mm.).

Table I

| Element or Image | D | ΔD | h | v | t |
|---|---|---|---|---|---|
| $A_O$ | −100″ | | 250 mm. | 250 mm. | |
| | | 99.6″ | | | |
| $L_O$ | −.36″ | | 21″ | 21″ | 0.375″ |
| | | 0.36″ | | | |
| $S_O$ | 0.0″ | | 1.0 mm. | 100 mm. | |
| | | 5.12″ | | | |
| $L_1$ | 5.12″ | | 3.76″ | ∞ | 0.125″ |
| | | 3.20″ | | | |
| $A_{1h}$ | 8.32″ | | 10.2 mm. | | |
| | | 11.14″ | | | |
| $S_{1h}$ | 19.46″ | | 2.85 mm. | | |
| | | 0 | | | |
| $L_2$ | 19.46″ | | 4.51″ | ∞ | 0.125″ |
| | | 6.70″ | | | |
| $L_3$ | 26.16″ | | 9.02″ | 9.02″ | 0.437″ |
| | | 1.187″ | | | |
| $A'$ | 27.35″ | | 6.42 mm. | 64.2 mm. | |
| | | 0.125″ | | | |
| $G_1, G_2, \ldots$ | 27.50″ | | 8.53″ | ∞ | 0.125″ |
| | | 12.50″ | | | |
| $L_4$ | 39.98″ | | 12.63″ | ∞ | 0.187″ |
| | | 0.19″ | | | |
| $S'$ | 40.16″ | | 5.10 mm. | 51.5 mm. | |
| | | 0.50″ | | | |
| $H_1, H_2, \ldots$ | 40.66″ | | ∞ | 12.63″ | 0.50″ |
| | | 0.24″ | | | |
| $L_5$ | 40.9″ | | 19.7″ | 19.7″ | 0.250″ |
| | | 17.1″ | | | |
| $L_6$ | 58.0″ | | 0.75″ | 0.75″ | 0.250″ |
| | | 0.61″ | | | |
| $A_1$ | 58.6″ | | 2.0 mm. | 2.0 mm. | |
| | | 0.157″ | | | |
| $S_1$ | 58.8″ | | 2.0 mm. | 2.0 mm. | |

Referring again to Figs. 4, 4a and 4b, and to Table I, it is to be noted that the aperture stop $A_O$ is located .100″ to the left of the entrance slit $S_O$. The height of the aperture stop in a vertical plane is $$A_{Ov} = 250 \text{ mm.}$$

and the width of the aperture stop in a horizontal plane is $$A_{Oh} = 250 \text{ mm.}$$

The aperture stop $A_O$ thus has an aspect ratio of unity.

The entrance slit $S_O$ is located at the origin of the abscissae which defines the positions of the other elements. The height of the entrance slit is $$S_{Ov} = 100 \text{ mm.}$$

and the width of the entrance slit $S_O$ is $$S_{Oh} = 1.0 \text{ mm.}$$

The aspect ratio of the entrance slit is thus 100.

Two maximum Lagrange constants exist in the region between the virtual aperture stop $A_O$ and the entrance slit $S_O$, namely a maximum vertical Lagrange constant $L_v$ and a maximum horizontal Lagrange constant $L_h$. In this particular case, the maximum vertical Lagrange constant $L_v$ is expressed by the following equation:

$$L_v = \frac{A_{Ov} S_{Ov}}{d}$$

and the maximum horizontal Lagrange constant $L_h$ is expressed by the following equation:

$$L_h = \frac{A_{Oh} S_{Oh}}{d}$$

where:

$d$ = distance from virtual image of aperture stop $A_O$ to the entrance slit $S_O$.

In this particular case, the values of these Lagrange constants are approximately $$L_v = 1.0 \text{ cm.}$$
$$L_h = 0.01 \text{ cm.}$$

It is to be noted that the maximum Lagrange constants in the two principal planes bear a ratio of 100 to 1, that is $$\frac{L_v}{L_h} = 100$$

Ordinarily, a high ratio of maximum vertical to horizontal Lagrange constants occurs in a monochromator because of the fact that the entrance slit is tall and narrow and the interior aperture stop, whether it be defined by a diffraction grating or by a prism or by the collimating mirror or by some other element of the monochromator is generally about as wide as it is high. Prior to this invention, unequal maximum vertical and horizontal Lagrange constants also existed in the sample region, but as will be seen hereinafter the Lagrange constant transformer 30 causes radiation transmitted along paths that fill a pair of square stop images in the sample region to pass through the monochromator along paths that fill the stops $A_O$ and $S_O$. By rendering the maximum vertical and horizontal Lagrange constants equal in the sample region more efficient use can be made of the radiation scattered from that region thereby making it possible to analyze smaller samples effectively than would be possible otherwise.

A field-flattening lens $L_0$ is located adjacent the entrance slit on the internal side thereof. This lens, which is spherical, has a focal length of $$F_{Oh} = F_{Ov} = 21.0″$$

Its thickness along the optic axis is $t_O = 0.375″$.

A cylindrical lens $L_1$ having a vertical axis is located 5.12″ from the entrance slit $S_O$. This lens has a horizontal focal length $$F_{1h} = 3.76″$$

The lenses $L_0$ and $L_1$ focus a horizontal image $A_{1h}$ of the aperture stop $A_O$ at a distance 8.32″ from the entrance slit $S_O$ and a horizontal image $S_{1h}$ of the entrance slit $S_O$ at a distance 19.46″ from the slit $S_O$. The width of the horizontal image $A_{1h}$ of the aperture stop so formed is $$A_{1h} = 10.2 \text{ mm.}$$

The width of the horizontal image of the entrance slit $S_O$ so formed is $$S_{1h} = 2.85 \text{ mm.}$$

A second cylindrical lens $L_2$ having a vertical axis is located at the position of the horizontal image $S_{1h}$ of the entrance slit. This lens, which has a thickness of 0.125″ has a horizontal focal length $$F_{2h} = 4.51″$$

A spherical lens $L_3$ is located 26.16″ from the exit slit $S_O$. This lens has a thickness of 0.437″ and a focal length $$F_3 = 9.02″$$

The lenses $L_2$ and $L_3$ form a horizontal image $A_{2h}$ of the aperture stop $A_O$ at a position 27.35″ from the slit $S_O$ by horizontally focussing an image of the image $A_{1h}$ at that position. The lenses $L_0$ and $L_3$ form a vertical image $A_{1v}$ of the aperture stop at the same position. The width of the horizontal image of the aperture stop so formed is $$A_{2h} = 6.42 \text{ mm.}$$

The height of the image so formed is $$A_{1v} = 64.2 \text{ mm.}$$

It is important to note that the lenses $L_0$, $L_1$, $L_2$ and $L_3$ thus act as a first anamorphoser having an anamorphotic ratio of 10. Such an anamorphoser forms an image $A'$ of the aperture stop $A_O$ at the position of the component images $A_{2h}$ and $A_{1v}$, but with different horizontal and vertical magnifications. The vertical magnification is 0.257 while the horizontal magnification is 0.0257. Even though the ratio of the height to the width of the image $A'$ is only 10 to 1, nevertheless the vertical and horizontal Lagrange constants applicable to radiation entering and emerging from that image have the same values as in the monochromator.

A first image slicer $R_1$ comprising a first series of lens segments $G_1$, $G_2$, $G_3$, $G_4$, $G_5$, $G_6$, $G_7$, $G_8$, $G_9$ and $G_{10}$, is located at the position of the image $A'$. Each of these lens segments designated generally by the letter G is in the form of a cylindrical lens having a vertical axis. The focal length of each of the lens segments is $$G_h = 8.53''$$

Each of the lens segments has a height which is 1/10 of the height $A_{1v}$ of the image $A'$ of the aperture stop, that is, the height of each of the lens segments is 6.42 mm. The various lens segments $G_1 \ldots G_{10}$ are arranged in a staggered array such as an echelon array in which the centers of curvature of the lenses in directions parallel to the optic axis are spaced apart horizontally by 3.41 mm.

The cylindrical lens segments $G_1 \ldots G_{10}$ slice the image $A'$ into ten equal parts $A_1' \ldots A_{10}'$ each of which is square, having a height and width of 6.4 mm., as illustrated in Fig. 5.

In the embodiment of the invention illustrated the lenses are arranged from top to bottom and from left to right in the order of the subscripts $1 \ldots 10$ of their designation $G_1 \ldots G_{10}$, when viewed along the axis toward the source unit.

It will be noted that each of the lens segments $G$, together with the spherical lens $L_3$, thus forms a separate double convex lens, and that the centers of these convex lenses, in effect, lie in different vertical planes spaced 3.4 mm. apart, but that they all lie in the same horizontal plane.

In practice the spherical lens $L_3$ and the set of lens segments $G$ are cemented to the opposite faces of a block or plate of glass $B_1$, which is shown in Figs. 4 and 7a, but is omitted from Fig. 4a for the sake of clarity. The block of glass is 0.750'' thick and the distances given in Table I are those employed when the block of glass is present. If it is omitted, all distances from $S_O$ greater than 26.16'' should be reduced by 0.26''. This block of glass may, of course, actually be in the form of a reflecting prism if for any reason it is desired to introduce a change in the direction of the optic axis X—X at a point between the positions of the lens $L_3$ and the lens segments G. In the latter case, the "opposite" faces are the two faces of the prism which intersect the rays along which light is transmitted. To form such a composite lens, the spherical lens $L_3$ is of the plano-convex type and each of the segments G is also of the plano-convex type. Such a composite image slicer is in the form of a rectangular-parallelopiped is illustrated in Fig. 7a while such an image slicer employing a 45° isoceles prism is shown in Fig. 7b. If desired, the segments G may be cemented directly to the lens $L_3$ if no rotation of the optic axis is desired. In any event the lens segments are cemented to each other and to a glass element to form a rigid unitary image slicer.

A cylindrical lens $L_4$ having a vertical axis is located 40.0'' from the entrance slit $S_O$. This lens has a thickness of 0.187'' and a horizontal focal length $$F_{4h} = 12.63''$$

Each of the composite lenses formed by the element $L_3$ and one of the respective segments G, together with the lens $L_4$, forms a horizontal image $S_{2h}$ of the horizontal image $S_{1h}$ that is located at the lens $L_2$. Each of these spherical lenses also form a vertical image $S_{1v}$ of the entrance slit $S_O$. The two images so formed by each of the segmental spherical lenses are brought to a focus at the same position 40.16'' from the entrance slit $S_O$ combining to form an image $S'$ of the entrance slit $S_O$. Each of the images $S'$ so formed has a height $$S_{1v} = 52.0 \text{ mm.}$$

and a width $$S_{2h} = 5.1 \text{ mm.}$$

The lenses $L_1$, $L_2$, $L_3$, $L_4$, and each of the lens segments $G_i$ thus acts as a second anamorphoser having an anamorphotic ratio of 0.1 where $i$ has each of the values 1, 2, 3 ... 10. Such an anamorphoser forms an image $S_1'$ of the entrance slit $S_O$ at the position of the component images $S_{1v}$ and $S_{2h}$, but with different horizontal and vertical magnifications. The vertical magnification is 0.52, while the horizontal magnification is 5.1. The anamorphoser formed by each of the lens segments $G_1 \ldots G_{10}$ transmits light that passes through the corresponding square image parts $A_1' \ldots A_{10}'$ to a different position. Thus, the various images $S_1', S_2' \ldots S_{10}'$ of the entrance slit $S_O$ formed by the different anamorphosers including the corresponding lens segments $G_1 \ldots G_{10}$ are deflected horizontally transverse to the optic axis X—X because of the fact that the centers of the lenses $G_1 \ldots G_{10}$ are displaced horizontally. By way of example, the radiation that is transmitted from the slit $S_O$ through the square image part $A_1'$ forms an image $S_1'$, while the radiation that is transmitted through the square image part $A_2'$ forms the image $S_2'$, etc. The horizontal displacement of the centers of the lens segments G are so chosen that all ten images $S_1', S_2' \ldots S_{10}'$ lie side by side with successive images contiguous, thereby forming a composite square image $S_c'$ having a height of the individual images $S'$.

A second image slicer $R_2$ is located approximately at the position of the composite image $S_c'$ so formed of the entrance slit $S_O$. This image slicer comprises ten cylindrical lens segments $H_1$, $H_2$ ... $H_{10}$.

The various segments H of the second image slicer and the lens $L_4$ may be cemented to opposite faces of a glass block in a manner similar to that by which the lens $L_3$ and the segments $G_i$ are cemented to a glass block is shown in Fig. 7b. In this case too the glass block may be omitted.

The ten cylindrical lens segments $H_1 \ldots H_{10}$ of the second image slicer $R_2$ have widths equal to the widths of the individual image $S'$, the width of each of the lens segments in a horizontal direction being $$S_{2h} = 5.1 \text{ mm.}$$

The rectangular image $S_i'$ that is formed by the cylindrical lens segment $G_i$ is formed at the face of corresponding cylindrical lens segment $H_i$ where $i$ again has each of the values 1, 2, 3 ... 10. Thus, for example, the rectangular image $S_1'$ that is formed by the cylindrical lens segment $G_1$ is formed at the face of corresponding cylindrical lens segment $H_1$. The rectangular image $S_2'$ that is formed by the cylindrical lens segment $G_2$ is formed at the face of corresponding cylindrical lens segment $H_2$ and so on.

Two spherical lenses $L_5$ and $L_6$ are arranged between the second image slicer $R_2$ and the sample cell 14. The first lens $L_5$ is located 40.9'' from the entrance slit $S_O$. This lens has vertical and horizontal focal lengths which are equal, namely, the focal length $$F_5 = 19.7''$$

The second lens $L_6$ is located 58.0'' from the entrance slit $S_O$. This lens also has vertical and horizontal focal length which are equal, namely, the focal length $$F_6 = 0.75''$$

It will be noted that the horizontal focal length of the cylindrical lens $L_4$ is equal to the vertical focal length of each of the lens segments $H_1 \ldots H_{10}$, so that in effect each of the lens segments $H_1 \ldots H_{10}$ combined with the cylindrical lens $L_4$ acts as a spherical lens. The lens segments $H_1 \ldots H_{10}$ are so located that each of the spherical lenses which it forms with the lens $L_4$ forms an image of the corresponding image part $A_1' \ldots A_{10}'$ at the same position within the sample cell 14. All of the images so formed in the sample cell are square since they have the same shape as each of the square image segments $A_1' \ldots A_{10}'$ and all of these square images are superposed and coextensive forming a single square image $A_3$ of the square vertical aperture stop $A_O$. To produce such superposition the centers of successive lens segments $H_1 \ldots H_{10}$ are spaced apart vertically by 1.94 mm. Thus, for example, more particularly, the spherical lens formed by the cylindrical lens segment $H_1$ and the cylindrical lens $L_4$ and the spherical lens $L_5$ and $L_6$ form a square image $A_3$ of the image part $A_1'$ in the sample cell 14. Likewise, each of the other vertical cylindrical lens segments $H_2 \ldots H_{10}$ forms an image $A_3$ of the corresponding image section $A_2' \ldots A_{10}'$ at the same location in the sample cell.

The two lenses $L_5$ and $L_6$ form an image $S_3$ of the composite square image $S_O'$. The image $S_3$ is also formed in the sample cell 14, and it too is square. Each of the images $A_3$ and $S_3$ has a height of 2 mm. and a width of 2 mm.

In Table I the positions of the aperture stop images $A_3$ and $S_3$ have been indicated on the assumption that no sample cell is present. It can be shown that if a sample is present, then the sizes of the aperture stop images $A_3$ and $S_3$ are unaffected, but their positions are changed, more particularly the distance between images $A_3$ and $S_3$ is proportional to the refractive index $n$ of the sample. In practice, therefore, the face of the sample cell 14 is located adjacent the front aperture stop image $A_3$ so that all of the radiation that is transmitted to the monochromator travels along rays that emerge from the end face of the cell, and not along rays which intersect the outer side wall of the cell.

In the sample cell, both the maximum vertical and horizontal Lagrange constants have equal values, since the product of the widths of the two images $A_3$ and $S_3$ equals the product of the heights of these images. By means of the image slicer illustrated herein, the maximum vertical Lagrange constant of the monochromator has been reduced by a factor of 10 in the transmission of light through the two image slicers $R_1$ and $R_2$, and the maximum horizontal Lagrange constant of the monochromator has been multiplied by 10, thus rendering the two maximum Lagrange constants equal in the sample cell. In effect, then, the optical system provided herein constitutes a Lagrange-constant transformer. It can be shown that the laws of thermodynamics require that the product of the vertical and horizontal Lagrange constants and the square of the index of refraction be constant throughout the system.

Expressed mathematically, the laws of thermodynamics require that $$n^2 L_v L_h = \text{constant}$$

throughout the entire beam from one end of the instrument to the other where the terms $L_v$ and $L_h$ are the maximum vertical and horizontal Lagrange constants in air as previously defined herein. This equation assumes that the cosine of the angle of the beam is nearly equal to unity. If this condition is not met, the cosine terms must be introduced.

It can be shown that if the ratio of the maximum vertical to the maximum horizontal Lagrange constants in the monochromator is $N^2$, that is if $$\left\{ \frac{L_v}{L_h} \right\}_C = N^2$$

and if the ratio of the maximum vertical to the maximum horizontal Lagrange constants in the sample space is $M$, that is if $$\left\{ \frac{L_v}{L_h} \right\}_S = M^2$$

then to produce equality of maximum horizontal and maximum vertical Lagrange constants and square aperture stop images in the sample cell, the number of lens segments employed in each of the image slicers $S_1$ and $S_2$ should be $N/M$. It can be shown that the ratio of the height to the width of the image $A'$ formed by anamorphosis at the first image slicer $R_1$ and that the ratio of the height to the width of the individual images $S'$ formed by anamorphosis at the second image slicer $R_2$ should both be $N/M$, that is, in this case $$\frac{S_{1v}}{S_{2h}} = \frac{N}{M}$$

Generally speaking the lenses which form the image $A'$ of the aperture stop at the first slicer $R_2$ anamorphoses the aperture stop by a anamorphotic ratio $$\frac{N}{M} = \frac{\text{vertical magnification of aperture stop } A_0}{\text{horizontal magnification of aperture stop } A_0}$$

and the optical elements which form each of the images $S'$ of the entrance slit $S_O$ at the second image slicer $R_2$ anamorphoses the image of the entrance slit $S_O$ by the anamorphotic ratio $$\frac{M}{N} = \frac{\text{vertical magnification of entrance slit}}{\text{horizontal magnification of entrance slit}}$$

In order to utilize as small a sample as possible effectively and economically, a sample cell of circular or square cross-section is employed. Greatest use of radiation emerging from such a sample cell is obtained by utilizing square stops $A_3$ and $S_3$ for which $M=1$. In the particular case specifically described above $N=10$. Accordingly, ten segments were employed in both image slicers.

By employing a number of lens segments in each of the two slicers other than N, Lagrange constant transformation may still be achieved with the single-slit monochromator described above, but in this case the maximum vertical and horizontal Lagrange constants at the sample cell will not be equal. It will also be understood that if the number of lens segments in the two slicers are unequal, some advantages of this invention may be achieved even though one or both of the images in the sample region is not square.

In the foregoing detailed description of the optical system, the paths along which radiation would travel through the monochromator and then to the right through the Lagrange-constant transformer and then into the sample cell 14 have generally been considered. If light were to travel in this direction, then all light traveling through the space within the boundaries of the aperture stops $A_O$ and through the entrance slit $S_O$ would also travel through two square aperture stop images $A_3$ and $S_3$ in the sample cell. Due to the principle of reversibility, it is clear that all radiation which is scattered by the sample cell 14, and which passes to the left along paths that extend through the square image area $S_3$ and through the square image area $A_3$, is transmitted along the same paths as previously described through the Lagrange-constant transformer and through the entrance slit $S_O$ and through the aperture stop $A_O$. This is sometimes referred to as direct travel.

Considering reverse travel of radiation, it will be noted that the slicers $R_1$ and $R_2$ transmit energy from different vertically spaced, horizontally extending zones of the aperture stop $A_O$ to the same area at the sample cell, forming coextensive images there. It will also be noted that the image $S_c'$ formed at the second slicer $R_2$ bears a conjugate relationship with the image $S_3$ at the sample cell, and that when considering direct travel of radiation, horizontally spaced, vertically extending zones $S_1'$, $S_2'$, $S_3'$, $S_4'$, $S_5'$, $S_6'$, $S_7'$, $S_8'$, $S_9'$, and $S_{10}'$ of the image $S_c'$ are all focused as coextensive images over the area of the entrance slit $S_O$. In other words, considering reverse travel, equal horizontal slices of the aperture stop $A_O$ are focused in coincident position at image $A_3$, and considering direct travel, equal vertical slices of the aperture stop image $S_3$ are focused at the entrance slit $S_O$. Thus, different horizontal slices of the aperture image stop $A_O$ are conjugated with respect to a square image $A_3$ in the sample region and different vertical slices of a square composite slit image $S_3$ in the sample region are conjugated at coincident positions at the rectangular aperture stop $S_O$.

Looked at in another light, the two lenses $L_5$ and $L_6$ image the image area $S_3$ at the image slicer $R_2$ as a square image $S_c'$. Furthermore, each of the vertical lenses $H_i'$ forms a square image $A_i'$ of the image area $A_3$ at the corresponding horizontal lens $G_i$ of the first image slicer $R_1$, where $i=1, 2 \ldots 10$. Thus, for example, the vertical lens $H_1$ forms a square image $A_1'$ of the image area $A_3$ at the horizontal lines $G_1$. Similarly, the vertical lens $H_2$ forms a square image $A_2'$ of the image area $A_3$ at the second horizontal lens $G_2$ and so on.

In this way, a stack of ten square images $A_1', A_2' \ldots A_{10}'$ of the image area $A_3$ are arranged vertically one above the other at the first image slicer $R_1$, thus forming a composite rectangular image $A'$ having a height ten times its width. The anamorphoser comprising the lenses $L_0, L_1, L_2,$ and $L_3$ forms a square image of the rectangular image $A'$ at the aperture stop $A_O$. At the same time, the anamorphoser comprising lenses $L_1, L_3$ and $L_4$ and each of the horizontal lenses $G_i'$ forms an image of the corresponding sections $S_i'$ of the image $S_c'$ of the area $S_3$ at the entrance slit $S_O$, where $i=1, 2 \ldots 10$. Thus, the image segment $S_1'$ is focused by means of the lenses $L_1$, $L_3$ and $L_4$ and by the horizontal segmental lens $G_1$ at the entrance slit $S_O$. Likewise, the image segment $S_2'$ is focused by means of the lenses $L_1, L_3$ and $L_4$ and by the horizontal segmental lens $G_2$ at the entrance slit $S_O$, and so on. Each of the ten images so formed are coextensive with the entrance slit $S_O$. It is interesting to note that this arrangement is entirely different from that employed by Bowen and from that employed by Benesch and Strong, since in each of their devices only one slicing and stacking operation occurs. But in this invention two aperture stops or their images are sliced and stacked, and the two slicing and stacking operations occur in transverse directions.

In the present illustrated system, two sets of aperture stop images are formed. One of these sets includes the image $A_3$ and the image $A'$ of the virtual aperture stop $A_O$. The other set includes the image $S_3$ and the image $S_c'$ of the aperture stop established by the entrance slit $S_O$. The images $A$ and $S_c'$ are located at the first and second slicers $R'$ and $R''$ respectively. In this system, the aperture stop image that is nearer the end of the sample tube 14 from which the radiation emerges is square and is real. The other aperture stop image $S_3$ is also square and real. In the specific form of the invention described above, the two aperture stop images are of equal size. However, the aperture stop image $S_3$ may be formed at other points on either side of the first mentioned aperture stop $A_3$ and may be either a real image or a virtual image. It can be shown that the farther the image $S_3$ is formed from the first aperture stop image, the smaller the sample cell diameter may be.

It will be noted that one of the principal functions of the lens segments $G_1 \ldots G_{10}$ is to produce a series of separate non-overlapping but contiguous, horizontally spaced images of the entrance slit $S_O$ at the second image slicer $R_2$. Even though in the specific embodiment of the invention a plurality of cylindrical lenses $G_i$ having vertical axes are employed for this purpose, other means for deflecting the images of the entrance slit $S_O$ horizontally to spread them uniformly over a square area $S_c'$ at the second image slicer $R_2$ may be employed. Likewise, it will be noted that one of the principal functions of the lens segments $H_1 \ldots H_{10}$ is to produce a series of separate, vertically spaced images $A_i'$ of the area $A_3$ at the first image slicer $R_1$. Likewise, even though in the specific embodiment of the invention a plurality of cylindrical lenses having horizontal axes are employed for this purpose, other means for deflecting the images of the area $A_3$ vertically to spread them uniformly over a vertically elongated rectangular area and to illuminate that area substantially uniformly may be employed. In any event, it is to be noted that the first slicer $R_1$ in effect divides an image of the square aperture stop $A_O$ into a plurality of vertically spaced, horizontally extending zones or strips, and that it deflects various rays horizontally so as to form a plurality of coextensive square images of these strips at the aperture stop image $A_3$. Likewise, it is to be noted that the second slicer $R_2$ in effect divides an image of the square aperture stop image $S_3$ into a plurality of horizontally spaced, vertically extending zones or strips, and that it deflects various rays vertically so as to form a plurality of coextensive images of these strips at the entrance slit $S_O$.

The invention has been described above in terms of an arrangement in which both horizontal and vertical images of the aperture stop are formed at the first image slicer $R_1$, and both horizontal and vertical images of the entrance slit $S_O$ are formed at the second image slicer $R_2$. However, other arrangements may also be employed in which radiation transmitted by reverse paths through the aperture stop $A_O$ is divided into a number of horizontally-extending vertically-spaced slices and the same radiation transmitted along direct paths extending through the stop image $S_3$ is divided into a plurality of vertically extending, horizontally-spaced slices. The radiation is transmitted along paths that pass through corresponding horizontal and vertical slices or zones, but not along paths that would pass through non-corresponding slices or zones.

In the specific embodiment of the invention described above, it has been tacitly assumed that all of the rays entering one face of a lens segment of either image slicer also emerges from the other face of that lens segment. This condition is not necessarily true, especially if the image is narrow or the inclinations of the rays are large. Because of the fact that the various images of the entrance slit $S_O$ formed at the second slicer are very narrow, substantial losses of energy could occur in the second slicer if the width of the lens segments were made the same as the widths of the slit images located there. For this reason, and in order to reduce such losses, in practice lens segments having a width of 6.0 mm. have been employed when the width of the entrance slit images was 5.1 mm. and the horizontal displacements of the slicer elements $G_i$ were correspondingly increased.

In the forms of image slicer described above, it has been assumed that the optic axes of successive segments of each image slicer are displaced in the same direction from the prior lens segment. It will be understood that this is not necessary, but that satisfactory results can be obtained as long as the optic axes of the various lens segments have the positions indicated above even though the segments of each slicer are arranged in a different order and so long as proper correspondence exists between the lens segments of the two image slicers.

Though the invention has been described above in a form which employs lens segments to perform the image slicing and deflection, it will be understood that other means may be employed to accomplish this result. For example, the two sets of lens segments of the respective image slicers may be replaced by prisms or even by mirrors. In any case, one slicer is employed for slicing an image of the aperture stop $A_O$ and the other slicer is employed for slicing an image of the entrance slit image $S_3$. It is to be noted that, when thus considered, the Lagrange-constant transformer of this invention slices the aperture stop image $S_3$ when considering the direct or actual travel direction of the rays, but slices an aperture stop image $A_O$ when considering reverse travel direction of rays. Such slicing of images of both aperture stops characterizes the Lagrange-constant transformer of this invention.

APPLICATION TO MULTIPLE-SLIT MONOCHROMATOR

Figure 9:
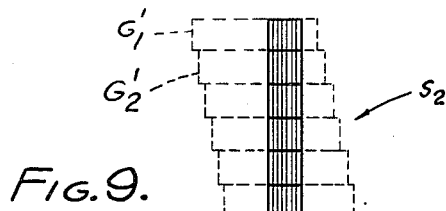
Fig. 9 is a vertical sectional view of the first image slicer employed with the twin-slit monochromator.

An embodiment of the invention employing a multiple-slit spectrophotometer is illustrated in Figs. 8 and 9. This multiple-slit spectrophotometer is substantially identical with that previously described except as pointed out specifically hereinafter.

The monochromator $40'$ of this spectrophotometer is substantially identical with that previously described except that each of the slits $S_O$, and $S_E$ is replaced by a double or twin slit that is a pair of closely spaced slits. Thus the entrance slit $S_O$ is replaced by a pair of entrance slits $S_O'$ and $S_O''$. Likewise, the intermediate slit $S_I$ is replaced by a pair of intermediate slits $S_I'$ and $S_I''$. Likewise, the exit slit $S_E$ is replaced by a pair of exit slits $S_E'$ and $S_E''$. The slits are so arranged that the first set of slits $S_O'$, $S_I'$, and $S_E'$ form, in effect, one double monochromator, and the second set of slits $S_O''$, $S_I''$, and $S_E''$ form a second double monochromator. However, both of these monochromators employ the same lenses, mirrors and gratings in common. The properties of multiple slit monochromators have been described by Dr. W. A. Shurcliff in the Journal of the Optical Society Am. 39, 1048 (1949).

The width of each of the entrance slits $S_O'$ and $S_O''$ is 0.5 mm. and their heights are 10 cm. and their centers are spaced 5 mm. apart. This twin-split monochromator $40'$ possesses the resolving power of a single-slit monochromator in which the height of the entrance slit is 20 cm. and the width of the entrance slit is 0.5 mm. Such a single-slit monochromator, it is to be noted, is characterized by a ratio of maximum vertical to maximum horizontal Lagrange constants of 400. In accordance with the principles outlined above, the desired Lagrange-constant transformation could be obtained for such a single-slit system by employing twenty elements in each of the slicers $R_1'$ and $R_2'$ and an anamorphotic ratio of 20. But by employing two slits of half-height, the desired transformation can be achieved by employing only ten elements in the first image slicer $R_1'$ and twenty elements in the second image slicer $R_2'$ and by employing an anamorphotic ratio of 10.

Figure 10:
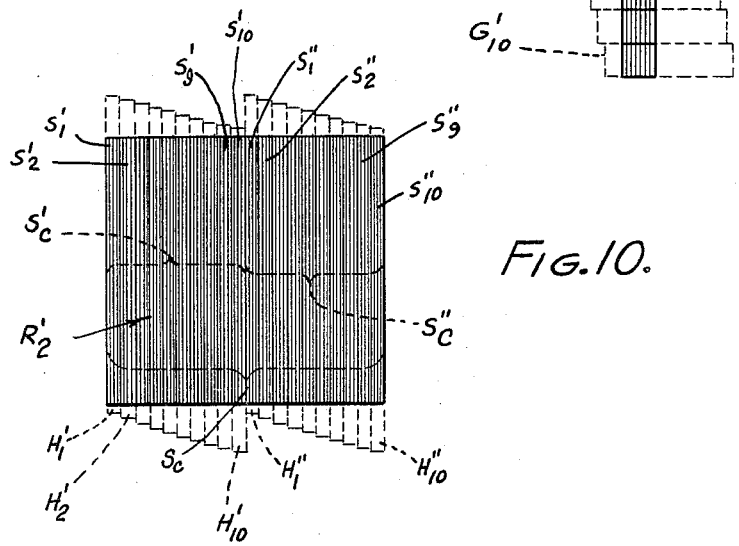
Fig. 10 is a vertical sectional end view of the second image slicer employed with the twin-slit monochromator.

More particularly, the first image slicer $R_1'$ comprises ten slicer elements $G_1'$, $G_2'$ ... $G_{10}'$ in the form of lens segments having the same focal properties as the lens segments of the corresponding image slicer $R_1$ of Figs. 4, 4a and 5. In this case, however, the optic axes of successive lens segments are spaced apart horizontally by 1.70 mm. This displacement, it will be noted, is one-half the displacement employed in the image slicer $R_1$ of the single-slit monochromator described above. As a result, two composite images $S_c'$ and $S_c''$ of the two entrance slits $S_O'$ and $S_O''$ are formed in side-by-side relationship at the second image slicer $R_2'$ as indicated in Fig. 10. Each of these composite images has the same height as that formed in the single-slit monochromator previously described, but only half the width. The aspect ratio of each composite image $S_c'$ and $S_c''$ corresponding to each slit $S_O'$ and $S_O''$ has a low aspect ratio of two, while the aspect ratio of the entire composite image formed by them has a low aspect ratio of unity.

However, it will be noted that as in the previous case a single anamorphosed image of the virtual aperture stop $A_O$ is formed at the first image slicer $R_1'$, and that this image $A'$ is sliced horizontally into ten equal square segments $A_1'$, $A_2'$ ... $A_{10}'$ by the horizontal image slicer, all as illustrated in Fig. 9. Each of these square segments is 6.42 mm. on the side, the same as in the foregoing single-slit spectrometer, since their areas are substantially unaffected by the fact that narrower twin slits are employed.

Each of the lens segments $G_1'$, $G_2'$ ... $G_{10}'$ forms a pair of real images of the twin entrance slit $S_O'$, $S_O''$ at the second image slicer. The twenty images formed there are arranged on contiguous, side-by-side relationship, thereby forming a square composite image 51 mm. on each side. Each of the individual images of each entrance slit $S_O'$ and $S_O''$ has a width of 2.55 mm. and a height of 51 mm.

The structure of the composite image $S_C$ thus formed at the second image slicer $R_2'$ is indicated in Fig. 10. There it will be noted that the square image is divided into twenty equal, contiguous, vertically extending, rectangular segmental images arranged in a horizontal array. The centers of these images are 2.55 mm. apart. Reading from left to right when facing this image in the direction extending toward the sample, the images are arranged in two groups, namely, the first group $S_1'$ ... $S_{10}'$, the second group $S_1''$ ... $S_{10}''$. Each of the lens segments $G_i'$ thus forms two images $S_i'$ and $S_i''$ that are spaced 25.5 mm. apart horizontally, thus forming the composite square image desired. Here, as before, the subscript "i" can have any value from 1 to 10. For example, the lens segment $G_1'$ forms the images $S_1'$ and $S_1''$ of the two slits $S_O'$ and $S_O''$ respectively. Likewise, the lens segment $G_2'$ forms the images $S_2'$ and $S_2''$ of the two slits $S_O'$ and $S_O''$, respectively. And so on.

The second image slicer $R_2'$ comprises two sets of lens segments. Each of these lens segments has a width of 2.6 mm., and its face is placed directly opposite one of the segments of the composite image $S_C'$. The first group of vertical slicer elements $H_1'$ ... $H_{10}'$ are located at the positions of the images $S_1'$ ... $S_{10}'$, respectively. Thus, for example, the lens segment $H_1'$ is located at the position of the segmental image $S_1'$. Similarly, the lens segment $H_2'$ is located at the position of the segmental image $S_2'$, and so on. The second group of vertical slicer elements $H_1''$ ... $H_{10}''$ are located at the positions of the images $S_1''$ ... $S_{10}''$, respectively. Thus, for example, the lens segments $H_1''$ is located at the position of the segmental image $S_1''$. Similarly, the lens segment $H_2''$ is located at the position of the segmental image $S_2$. And so on.

The lens segments $H_i'$ and $H_i''$ that are opposite images $S_i'$ and $S_i''$ formed by each segment $G_i'$ of the first image slicer are coaxial. The lens segments of each group of slicer elements of the second image slicer $R_2'$ are arranged in echelon fashion. The optic axes of successive lens segments of each group are displaced from each other vertically by 1.94 mm.; that is, by the same amount as in the single-slit spectrophotometer. Thus, for example, the lens segments $H_1'$ and $H_1''$ are coaxial, and the lens segments $H_2'$ and $H_2''$ are coaxial, but the lens centers or optic axes of the two lens segments $H_2'$ and $H_2''$ lie in a horizontal plane 1.94 mm. beneath the horizontal plane in which the centers or optic axes of the lens segments $H_1'$ and $H_1''$ lie.

The lenses $L_5$ and $L_6$ have the same properties as those of the single-slit spectrophotometer described hereinabove.

With this arrangement, the two sets of slicers cooperate to define a beam space in the sample region which is characterized by equal vertical and horizontal Lagrange constants. More particularly, the various segments of the second image slicer $A_2'$ focus all the square segments of the image $A'$ at the aperture stop image $A_3$, the images formed there being of equal area and coextensive. Furthermore, the square composite image $S_C'$ is imaged at the aperture stop image $S_3$.

It is thus seen that by employing image slicers, it is possible to alter the shape of a beam having a high maximum Lagrange-constant ratio in a multiple-slit monochromator to a beam having a unit maximum Lagrange-constant ratio in a sample region. Furthermore, by applying the principles explained hereinabove, maximum Lagrange constant ratios may be transformed to provide predetermined unequal maximum Lagrange-constants in the sample region.

Though the invention has been described only with particular reference to its application to a two-slit monochromator, it is clear that it may be also applied to monochromators employing a greater number of slits at the positions of the entrance slit $S_O$, the intermediate slit $S_I$, and the exit slit $S_E$.

CELL OPTICS

In accordance with this invention, both Raman radiation and other scattered radiation are transmitted to a double monochromator. In the embodiment of the invention which makes possible the use of a minimal sample of volume, some of the Raman radiation is internally reflected at least several times from the side walls of the sample cell before being transmitted to the monochromator. Furthermore, the window or aperture stop image $A_3$ through which the Raman radiation is transmitted from the sample cell to the monochromator is not necessarily inscribed within the circular area formed by the inner surface of the cell wall. As a result, background radiation is transmitted to the monochromator together with the Raman radiation of the sample. At the same time, the optical characteristics of the sample cell 14 are so arranged that the extreme angles of the rays defined by the maximum Lagrange constant ratios applicable to the sample region lie within the angles within which total reflection from the side walls of the sample cell occurs.

The use of such reflected Raman radiation is not free of disadvantages. However, these disadvantages are largely overcome by use of a double monochromator. The chief advantage of employing a double monochromator resides in its ability to eliminate the effects of radiation that is scattered by imperfections on the surface of or within the wall of the sample cell. Since such radiation which originates in scattering, largely by the Tyndall effect, is unchanged in frequency, it constitutes unwanted monochromatic radiation having the same wavelength as the radiation that is exciting the Raman spectrum and which is therefore rejected by the double monochromator. The optical characteristics of the useful beam emerging from the sample cell 14 can be understood by referring to Figs. 11 and 12 along with Figs. 3 and 4b.

Figure 11:
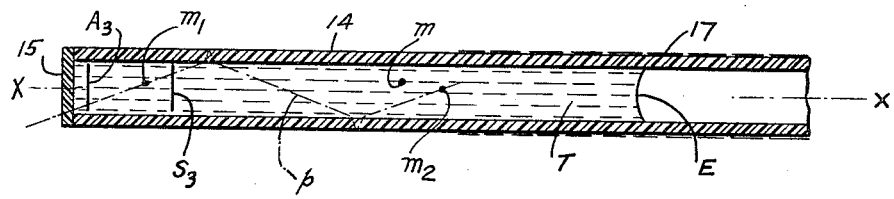
Fig. 11 is a cross-sectional view of a sample cell.

Referring to Fig. 11, it is to be noted that the sample cell 14 is in the form of a thin-walled capillary tube that is closed at one end by means of a flat disk 15 perpendicular to the optic axis X—X passing concentrically through the center of the tube. Sample cells actually employed to analyze small samples in this Raman spectrophotometer had outside diameters of 3.0 mm. and a wall thickness of 0.1 mm., thus providing an internal circular cylindrical sample space that circumscribes a square cross-section of 2 mm. on each side. A small sample T of liquid having a volume of about 0.25 ml. fills a part of such sample cell having a length of about 80 mm. As indicated in Fig. 11, the free end E of the liquid T may be formed within a part of the sample cell which bears an opaque coating 17, such as black paint, at the open end of the sample cell. Even if such a coating is not employed, Raman spectra may be analyzed. However, where only a predetermined volume of sample is to be exposed to exciting radiation, as where quantitative analysis of the sample is desired, such a coating is employed to limit the portion of the sample cell that is exposed to exciting radiation to a predetermined length.

The sample cell 14 is mounted within the housing 18 with its closed end adjacent the lens $L_6$ so that the square aperture stop images $A_3$ and $S_3$ of the aperture stop $A_O$ and the entrance slit $S_O$ lie near the closed end. To explain certain optical principles, it is assumed in Fig. 11 that the two stop images $A_3$ and $S_3$ are of the same size and that they are arranged within the liquid T and that the area A is near the plate 15. In practice though the diagonal of the aperture stop image may exceed the inside diameter of the tubular sample cell, though it is preferably less than the outside diameter of the cell.

Exciting radiation emitted from the source 12 enters the sample cell through the transparent walls thereof and strikes molecules $m$ of the liquid sample. These molecules absorb photons of exciting radiation and re-radiate them with a quantized change in energy level, scattering them in all directions. In this way, the monochromatic exciting radiation yields a plurality of Raman spectrum lines that are characteristic of the molecules of the sample. The only radiation which can be transmitted through the monochromator 40 is radiation which is transmitted along paths, such as the path $p$, which extend through the areas of both images $A_3$ and $S_3$.

For example, Raman radiation scattered from molecules $m_1$ in the liquid that are located between the two images $A_3$ and $S_3$ can travel in the direction of the path $p$ through the image area $A_3$ and thence through the Lagrange-constant transformer and through the monochromator 40 to the photocell 70. It will be noted, however, that radiation can be transmitted through the Lagrange-constant transformer 30 and the monochromator 40 along the same optical path even though it is radiated from molecules $m_2$ which are beyond both of the images $A_3$ and $S_3$. Furthermore, it will be noted that radiation from many such molecules travels along that path after being reflected at the wall of the sample tube 14.

In accordance with this invention, the angle of the extreme rays which can pass through the aperture stop image $A_3$ and through the monochromator is so established that the only radiation that is transmitted along reflected paths are those which are subject to total reflection at the wall of the sample tube.

Total reflection of the extreme rays occurs at the external surface of the glass wall. Such total reflection occurs if the angle $\alpha$ of the rays in the sample which are inclined most to the axis is less than or equal to the complement $\beta$ of the applicable critical angle. In other words, the extreme rays are those which pass through the stop images $A_3$ and $S_3$ at an angle $\alpha$, given by the following equation:

$$\cos \beta = \frac{1}{n}$$

$$\alpha \leq \beta$$

Figure 12:
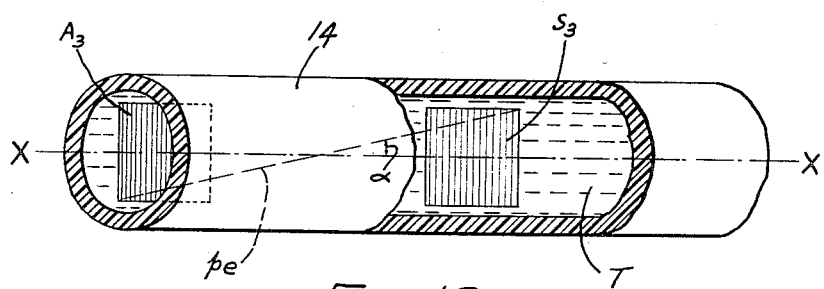
Fig. 12 is an isometric diagram employed in explaining the cell optics.

The extreme ray inclined at the greatest angle with respect to the optic axis X—X is a ray that travels from the end of a diagonal through one of the aperture stop images and through the end of the parallel diagonal of the other aperture stop image. Thus, for example, as indicated in Fig. 12, an extreme ray $P_e$ travels from the upper right-hand corner of aperture stop $S_3$ to the lower left-hand corner of aperture stop $A_3$, as indicated in Fig. 12. In the case of the spectrophotometers described above, the value of the angle $\alpha$ for a water sample is $\alpha = 28°$. It is well known that the index of refraction of almost all liquids is greater than the index of refraction of water. Thus, for example, the index of refraction of most hydrocarbon liquids is about 1.50 or more, while the index of refraction of water is about 1.33. It can be shown that if the foregoing equation for $\alpha$ is satisfied for water, then it is also satisfied for all liquids that have an index of refraction greater than that of water. For water, we have $$\beta = 41°$$

Since the angle of inclination $\alpha$ of the extreme ray is substantially less than 41° for water, it is clear that all radiation transmitted from the sample cell to the monochromator is that which emerges from the sample cell along the axis X—X within a cone within which total reflection occurs in the sample cell. This being true for water, it is also true for all liquids having an index of refraction greater than that of water.

It can be shown that the minimum diagonal D that may be employed depends upon the Lagrange constant, the distance between the aperture stops $A_3$ and $S_3$, and the index of refraction.

It can be shown that the useful cross-sectional area of the sample through which radiation is transmitted into the monochromator 40 decreases as the index of refraction of the liquid increases. It is thus seen that the larger the index of refraction of the sample, the smaller the diameter of the capillary tube may be while still taking full advantage of the transmissivity, or, in other words, the aperture stops of the monochromator 40.

Figure 13:
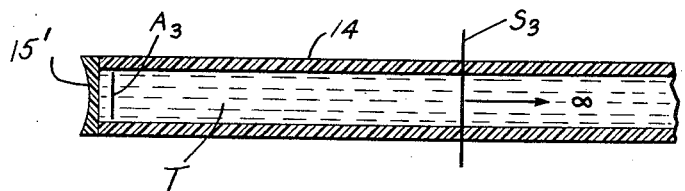
Fig. 13 is a cross-sectional view of an alternative embodiment of the sample cell.
Figure 14:
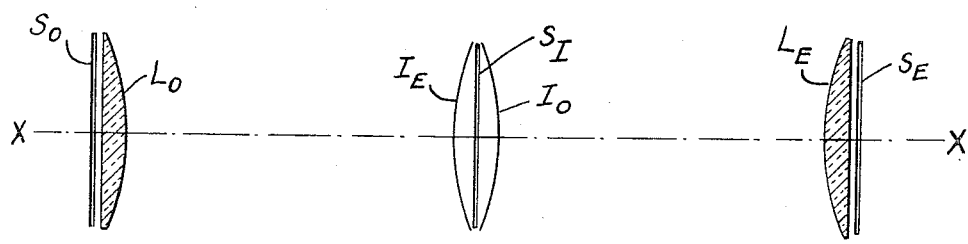
Fig. 14 is a schematic diagram of the single-slit monochromator employed in explaining the action of the field flattener.

It can be shown further that if the area of the aperture stop image $S_3$ is made still larger without substantial change of the area of the aperture stop image $A_3$, the angle of inclination of the extreme ray is further decreased. Such alteration may be achieved in a number of ways, such as by replacing the flat plate 15 at the end of the sample cell 14 by a negative lens 15', as illustrated in Fig. 13. In fact, with this arrangement, the location of the aperture stop image may be moved to infinity. For this condition, the value of the angle of inclination for a given size of aperture stop $A_3$ is reduced by a factor of about 2. For this reason, the size of the aperture stop $A_3$ may be reduced for a given angle $\alpha$, thus permitting use of even a smaller diameter sample cell.

By restricting the angle of the rays to angles within which total reflection occurs, no radiation transmitted from an external source such as the source 12 and through the walls 14 of the sample cell can be transmitted through the monochromator unless the radiation has been scattered, either by the molecules of the sample or by the molecules of the glass wall.

Generally speaking, the intensity of the Raman spectrum received by the monochromator is proportional to the length of the cell, that is, to the length of the column of liquid that is exposed to exciting radiation. Heretofore, it has been necessary to limit the length of the cell to a region in which no reflection of rays from the walls of the sample cell occurs. In accordance with this invention, the length of the sample cell is made large enough to permit at least several internal reflections. Since, so long as the Lagrange relations are satisfied, the intensity of the spectrum depends upon the length of the sample and not upon its cross-sectional area, this invention makes it possible to produce more intense Raman spectra with small samples than was heretofore possible.

Although the invention has been described with reference to its application to a system in which Raman radiation emerges from the closed end of a sample tube, it will be understood that the sample tube may be reversed end-to-end, and that use may be made of the radiation emerging from the open end of the tube through the meniscus of the liquid. In fact, the use of such a meniscus may be advantageous because the meniscus acts as a negative lens.

It will be understood, of course, that for rays inclined only slightly relative to the optic axis X—X, total reflection may occur at the inner surface of the wall of the sample tube. Rays emerging from the sample cell at such small angles are relatively free of any scattered radiation other than Raman radiation. But by employing a double monochromator in accordance with this invention, it becomes possible to collect and analyze in the monochromator radiation that emerges from the sample even over much larger angles up to the angle of total reflection at the external surface of the sample cell.

For the most effective use of the invention, the length of the sample exposed to exciting radiation is made many times, and at least several times, the axial length ($l$) of the cell along which an extreme ray of the beam travels between successive reflections of opposite walls. In other words, the length $l$ of the sample is such that $$l \gg \frac{nd^2}{2L}$$

where $d =$ diameter of the cell and $L = Lv = Ln$.

It is thus seen that a Raman spectrophotometer of greater sensitivity is provided in accordance with this invention by employing a double monochromator and by employing a sample cell arrangement in which multiple reflection of the radiation detected occurs.

When the lens $L_6$ is employed as described above, high sensitivity is obtained in the recording of Raman spectra of very small liquid samples by making use of multiple-reflected radiation that is scattered from points in the sample over a length of sample that is large. By altering the focal length of the lens $L_6$ and its separation from lens $L_5$ and the position of the sample cell, the areas of the images $A_3$ and $S_3$ and their distances apart may be increased, thus adapting the system for use with a large sample. Such an arrangement is particularly useful where it is necessary to avoid the transmission of any radiation from the wall of the sample cell to the monochromator because the Raman spectrum is extremely feeble but the sample available is large. In such a case, it is desirable to employ a sample cell of conventional shape having a coated horn at the open end. But even in this case, too, the employment of a Lagrange-constant transformer is advantageous.

THE FIELD FLATTENER

As pointed out above, a field flattener lens $L_0$ is employed adjacent the entrance slit $S_O$. A similar field flattener lens $L_E$ is employed adjacent the exit slit $S_E$. Such field flattener lenses make it possible to achieve high resolving power with a double monochromator having unusually large ratio of slit height to focal length. The mode of operation of the field flattener lenses $L_0$ and $L_E$ may be understood by means of the following explanation taken in connection with the schematic diagram of Fig. 11.

In this diagram, a vertical section of various parts taken along the optic axis X—X of the monochromator are illustrated, the omission of other parts being indicated by the dotted portions of the axis X—X. One line represents the vertical section of the entrance slit $S_O$. Another line represents a vertical section of the intermediate slit $S_I$, and the remaining line represents a vertical section of the exit slit $S_E$. Vertical cross-sections of the two field flattener lenses $L_0$ and $L_E$ are illustrated. If the field flattener lens $L_0$ were not employed, the entrance slit $S_O$ would be imaged along the curved line $I_O$ by the action of the collimating mirror 48 as is well known. Likewise, if the field flattener lens $L_E$ were not employed, the entrance slit $S_E$ would be imaged along the curved line $I_E$ by the action of the collimating mirror 54'. If the outer ends of the two images $I_O$ and $I_E$ are located at the outer ends of the intermediate slit $S_I$ the remaining parts of the images $I_O$ and $I_E$ are bowed away from the corresponding slits in each case being focused on the opposite side of the intermediate entrance $S_I$ from the respective terminal slits $S_O$ and $S_E$ as indicated in the figure in highly exaggerated form.

The two field flattener lenses $L_0$ and $L_E$ are in the form of plano-convex lenses with their plane surfaces adjacent the slits $S_O$ and $S_E$ and with their curved surfaces facing the intermediate slit $S_I$. These lenses $L_0$ and $L_I$ introduce differential retardation of the transmission of light in such a way as to remove the bow from the two images $I_O$ and $I_E$, thereby producing two substantially flat images coinciding with the intermediate slit $S_I$. In this way, the two images $I_O$ and $I_E$ are brought into coincidence of the intermediate slit $S_I$. As a result, an improvement occurs in the transmission of energy from the entrance slit $S_O$ to the exit slit $S_E$.

In the particular case where the concave spherical mirrors 48 and 54 have focal lengths of 100 cm., two field flattening lenses $L_O$ and $L_E$ which were found to be satisfactory were made of glass having an index of refraction of 1.46 and the lenses had radii of curvature of 11.13" and vertical heights parallel to the slits $S_O$ and $S_E$ of 4.5".

The use of such field flattener lenses increases the resolution of the monochromator by virtue of the improved focussing obtained. It is to be noted that the field flattener lenses $L_O$ and $L_E$ need not be located at the terminal slits $S_O$ and $S_E$, but that they may be located at other points along the optic axis such as at positions adjacent to and on opposite sides of the intermediate slit $S_I$.

SPECTRAL CHARACTERISTICS

As previously indicated, a Raman spectrum recorded over a range of less than one octave corresponds to infrared absorption and emission spectra measured over several octaves. In the Raman spectrophotometer described herein the span of wavelengths to be detected is actually confined to a region between about 3,500 A. to about 6,500 A. This limitation of the span of wavelengths to which the spectrophotometer responds is established partly by the characteristics of the glass employed along the optical path and especially the glass used in the Lagrange-constant transformer 30, and partly by the characteristics of the phototube 70. Thus, when ordinary glass is employed in the Lagrange-constant transformer, radiation having a wavelength less than about 3,500 A. is absorbed. When a phototube such as a type 1P21 phototube is employed to detect the radiation transmitted through the monochromator, radiation having a wavelength greater than about 6,500 A. is not detected because the sensitivity of the phototube is very low above that wavelength.

OPERATION

In using the Raman spectrophotometer of this invention, a liquid sample is placed in the sample cell 14 and this cell is mounted in the source unit 10. The mercury lamp 12 and the fan 21 are then energized in the usual way. When the emission from the mercury lamp has been sufficiently stabilized, the motor of the control unit 60 is energized causing a strip of recording paper to be driven past a recording element in the recorder 90 in the conventional manner and simultaneously causing the two diffraction gratings 50 and 58 to rotate about their axes at the same rate, thus causing radiation from successive lines of the Raman spectrum to emerge from the exit slit $S_E$. As the Raman spectrum is scanned, the intensity of the energy in the spectrum at different wavelengths is detected by the phototube 70, amplified by the amplifier 80, and recorded by the recorder 90.

Part of a typical Raman spectrogram thus produced is illustrated in Fig. 2. The intensity of the various Raman lines are indicated by ordinates of this graph. The differential frequencies are indicated by the abscissa. However, the peak indicated at zero abscissa does not represent the intensity of the Rayleigh line of the same wavelength as the exciting radiation, because its intensity is too great to be displayed simultaneously together with the other, weaker peaks. The other peaks indicate the intensity of Raman lines corresponding to various permitted changes of energy level of the sample undergoing analysis.

It is to be noted that a certain amount of background and stray radiation appears on the spectrogram as indicated by the lower portions of the graph between the peaks. The effects of such background radiation including that which is scattered from the walls of the sample tube is greatly reduced at every wavelength by the use of the double monochromator, thus making possible reliable detection of the Raman spectrum of small samples.

Though various features of this invention have been described with particular reference to their application to Raman spectroscopy, it is clear that some features of the invention may be employed in many other ways. Furthermore, it is clear that, although only two particular forms of Raman spectrophotometer have been specifically disclosed herein, it will be obvious that the invention is not limited thereto, but is capable of embodiment in other forms. Various changes which will now suggest themselves to those skilled in the art may be made in the material, form, details of construction and arrangement of the elements without departing from the invention.

The invention claimed is:

1. In a spectrometer, means for supporting a sample for analysis in a sample region on an optic axis, said sample emitting radiation; a monochromator having an entrance slit and having a dispersing element arranged to form a spectrum of heterochromatic radiation entering said entrance slit, said monochromator having a first principal plane parallel to the length of said slit and having a second principal plane parallel to the width of said slit, the length of said slit being large compared to the width of said slit, the beam transmitted through said entrance slit and through said dispersing element being characterized by a maximum Lagrange aperture constant in said first principal plane that is large compared with the maximum Lagrange aperture constant in said second principal plane; and imaging means for collecting radiation that emerges from said sample along said optic axis and for transmitting such radiation through said entrance slit and toward said dispersing element, the beam of radiation so transmitted from the sample being characterized in the sample region by maximum Lagrange aperture constants in said two planes that have a low ratio compared with the ratio of the aforesaid Lagrange aperture constants, said imaging means comprising a Lagrange constant transformer including first and second spaced-apart crossed beam-deflecting units, each of the two beam-deflecting units having a series of parts that correspond with a series of parts in the other beam-deflecting unit, each pair of corresponding parts of the two deflecting units forming at said entrance slit substantially coextensive images by means of such radiation that emerges from said sample region along paths that extend through different zones of said sample region, which zones extend in the direction of said first principal plane but are located at different positions along said second principal plane, and each pair of corresponding parts of said two deflecting units forming within said monochromator images of a common area lying in said sample region, said images forming zones that extend in the direction of said second principal plane but are spaced apart in the direction of said first principal plane.

2. A spectrometer as defined in claim 1 in which each of said beam-deflecting units comprises a plurality of cylindrical focussing segments having axes that lie parallel to said optic axis, the optic axes of the segments of said first beam-deflecting unit being spaced apart in the direction of said first principal plane, the optic axes of the segments of said second beam-deflecting unit being spaced apart in the direction of said second principal plane.

3. A spectrometer as defined in claim 2 in which the cylindrical focussing elements of each of said beam-deflecting units are transparent and their edge faces are parallel to said optic axis and in which said cylindrical focussing elements of each unit are rigidly secured together with the adjacent faces of successive parts lying close together.

4. A spectrometer as defined in claim 1 in which said imaging means comprises anamorphotic means that has a magnification in said first plane that is large compared with the magnification in said second plane when considering radiation traveling from said sample region toward said monochromator and in which the square of the ratio of said first magnification to said second magnification equals the ratio of the maximum Lagrange aperture constant ratio of said monochromator and the maximum Lagrange aperture constant ratio of said sample region.

5. In a spectrometer, means for supporting a sample for analysis in a sample region on an optic axis, said sample emitting radiation; a monochromator having an entrance slit and having a dispersing element operatively arranged to form a spectrum of heterochromatic radiation that enters said entrance slit, said monochromator having a first principal plane parallel to the length of said slit and having a second principal plane parallel to the width of said slit, the length of said slit being large compared to the width of said slit, said slit defining one aperture stop having a very large aspect ratio, other parts of said monochromator defining a separate aperture stop of low aspect ratio, said aperture stops limiting a beam of radiation of any wavelength that is transmitted from the entrance slit to the dispersing element, said limited beam being characterized by a maximum Lagrange aperture constant in said first principal plane that is large compared with the maximum Lagrange aperture constant in said second principal plane; and imaging means for collecting radiation that emerges from said sample along said optic axis and for transmitting such collected radiation through said entrance slit and toward said dispersing element, the beam of the radiation so transmitted from the sample emerging from a region characterized by substantially equal maximum Lagrange aperture constants in said principal planes, both of the aperture stop images defining said latter Lagrange aperture constants having small aspect ratios, said imaging means comprising a Lagrange constant transformer including first and second spaced-apart crossed beam-deflecting units, each of the two beam-deflecting units having a series of parts that correspond with a series of parts in the other beam-deflecting unit, each pair of corresponding parts of the two deflecting units forming at said entrance slit substantially coextensive images by means of such radiation that emerges from said sample region along paths that extend through different zones, which zones extend in the direction of said first principal plane but are located at different positions along said second principal plane, and the respective pairs of corresponding parts of said two deflecting units forming within said monochromator images of a common area lying in said sample region, said images forming zones that extend in the direction of said second principal plane but are spaced apart in the direction of said first principal plane.

6. In a spectrometer, means for supporting an elongated tube of circular cross section for holding a sample in a sample region with the axis of the tube arranged along an optic axis; a monochromator having an entrance slit and having a dispersing element arranged to form a spectrum of heterochromatic radiation entering said entrance slit, said monochromator having a first principal plane parallel to the length of said slit and having a second principal plane parallel to the width of said slit, the length of said slit being large compared to the width of said slit, the beam transmitted by said entrance slit and said dispersing element being characterized by a maximum Lagrange aperture constant in said first principal plane that is large compared with the maximum Lagrange aperture constant in said second principal plane; and imaging means for collecting radiation that emerges from said sample along said optic axis and through one end of said tube and for transmitting such radiation through said entrance slit and toward said dispersing element, the angle over which such radiation is transmitted from said sample being so large and the length of the sample from which radiation emerges being so long that such transmitted radiation includes radiation emitted by a sample in such tube and multipli-reflected at the walls of said tube, said imaging means comprising a Lagrange constant transformer including first and second spaced-apart crossed beam-deflecting units, each of the two beam-deflecting units having a series of parts that correspond with a series of parts in the other beam-deflecting unit, each pair of corresponding parts of the two deflecting units forming at said entrance slit substantially coextensive images by means of such radiation that emerges from said sample region along paths that extend through different zones, which zones extend in the direction of said first principal plane but are located at different positions along said second principal plane, and the respective pairs of corresponding parts of said two deflecting units forming within said monochromator images of a common area lying in said sample region, said images forming zones that extend in the direction of said second principal plane but are spaced apart in the direction of said first principal plane.

7. In a Raman spectrometer, means for supporting an elongated sample holding tube in a sample region with the axis of the tube arranged along an optic axis; a double monochromator having an entrance slit and an exit slit and an intermediate slit and comprising one monochromator section, including a first dispersing element, operatively arranged between said entrance slit and said intermediate slit, and comprising a second monochromator section, including a second dispersing element, operatively arranged between said intermediate slit and said exit slit, said monochromator having a first principal plane parallel to the length of said slits and having a second principal plane parallel to the width of said slits, the lengths of said slits being large compared to the widths of said slits, a beam of radiation of any wavelength that is transmitted from the entrance slit to the first dispersing element and thence to the exit slit being characterized by a maximum Lagrange aperture constant in said first principal plane that is large compared with the maximum Lagrange aperture constant in said second principal plane; means for illuminating a sample in said sample holding tube throughout an extended length thereof with exciting radiation; imaging means for collecting radiation that emerges from said sample along said optic axis and through a substantially square area that occupies a large fraction of one end of said tube and for transmitting such radiation through said entrance slit and toward the dispersing element of said first monochromator section, the beam of the radiation so transmitted from the sample region emerging from a region in said sample characterized by substantially equal maximum Lagrange aperture constants in two planes corresponding to the principal planes of said monochromator, the angle over which such radiation is transmitted from said sample being so large in any plane and the length of the sample that is illuminated by exciting radiation being so long that such transmitted radiation includes radiation scattered by a sample in such tube and multipli-reflected at the walls of said tube, said imaging means comprising a Lagrange constant transformer including first and second spaced-apart crossed beam-deflecting units, each of the two beam-deflecting units having a series of parts that correspond with a series of parts in the other beam-deflecting unit, each pair of corresponding parts of the two deflecting units forming at said entrance slit substantially coextensive images by means of such radiation that emerges from said sample region along paths that extend through different zones, which zones extend in the direction of said first principal plane but are located at different positions along said second principal plane, and the respective pairs of corresponding parts of said two deflecting units also forming within said monochromator images of said square area, said images forming zones that extend in the direction of said second principal plane but are spaced apart in the direction of said first principal plane; and means responding to the intensity of radiation emerging from said exit slit.

8. In a Raman spectrometer, means for supporting an elongated sample holding tube of circular cross section in a sample region with the axis of the tube arranged along an optic axis; a double monochromator having an entrance slit and an exit slit and an intermediate slit, and comprising one monochromator section, including a first dispersing element, operatively arranged between said entrance slit and said intermediate slit, and also comprising a second monochromator section, including a second dispersing element, operatively arranged between said intermediate slit and said exit slit, said monochromator having a first principal plane parallel to the lengths of said slits and having a second principal plane parallel to the widths of said slits, the lengths of said slits being large compared to the widths of said slits, one of said slits defining one aperture stop having a very large aspect ratio, other parts of said monochromator defining a separate aperture stop of low aspect ratio, said aperture stops limiting a beam of radiation of any wavelength that is transmitted from the entrance slit to the first dispersing element and to the intermediate slit and to the second dispersing element and thence to the exit slit, said limited beam being characterized by a maximum Lagrange aperture constant in said first principal plane that is large compared with the maximum Lagrange aperture constant in said second principal plane; means for illuminating a sample in said sample holding tube throughout an extended length thereof with exciting radiation; imaging means for collecting radiation that emerges from said sample along said optic axis and through a substantially square area at one end of said tube and for transmitting such radiation through said entrance slit and toward the dispersing element of said first monochromator section, the radiation so transmitted from the sample region emerging from a region in said sample characterized by substantially equal Lagrange aperture constants in two planes corresponding to the principal planes of said monochromator, said imaging means comprising a Lagrange constant transformer including anamorphosing means and also including first and second spaced-apart crossed beam-deflecting units, each of the two beam-deflecting units having a series of parts that correspond with a series of parts in the other beam-deflecting unit, each pair of corresponding parts of the two deflecting units cooperating to form at said entrance slit substantially coextensive images by means of such radiation that emerges from said sample region along paths that extend through different zones, which zones extend in the direction of said first principal plane but are located at different positions along said second principal plane, and the respective pairs of corresponding parts of said two deflecting units also forming at said second aperture stop rectangular images of said square area, said rectangular images being spaced apart in the direction of said first principal plane; and means responding to the intensity of radiation emerging from said exit slit.

9. In an optical system for transmitting a beam of radiation from a limited space in a first region through a limited space in a second region along an optic axis, means for rendering the ratio of maximum Lagrange aperture constants of said beam in two mutually perpendicular planes parallel to the optic axis in one space different from the ratio of maximum Lagrange aperture constants of said beam in corresponding planes parallel to the optic axis in the other space, and for rendering the product of said two Lagrange aperture constants in one space equal to the product of said two Lagrange aperture constants in the other space, said means including: means for focussing in a first image area an image of a cross-sectional area transverse to the optic axis in the first space, said first image area comprising a first set of zones that are arranged in a vertical array; means for focussing in a second image area an image of a cross-sectional area transverse to the optic axis in the second space, said second image area comprising a second set of zones that are arranged in a horizontal array, the number of zones in the two sets being equal, one zone in each set corresponding to one zone in the other set; and means for selectively transmitting radiation that passes through each zone in each set through the corresponding zone in the other set.

10. In an optical system for transmitting a beam of radiation from a limited space in a first region through a limited space in a second region, means for rendering the ratio of maximum Lagrange aperture constants in first and second mutually perpendicular planes parallel to the optic axis in one space being different from the ratio of maximum Lagrange aperture constants in corresponding planes parallel to the optic axis in the other space, and for rendering the product of the two Lagrange constants in one space equal to said product of the two Lagrange aperture constants in the other space, said means including; means for focussing in a first image area an image of a cross-sectional area transverse to the optic axis in the first space, said first image area comprising a first set of zones that are spaced apart vertically; means for focussing in a second image area an image of a cross-sectional area transverse to the optic axis in the second space, said second image area comprising a second set of zones that are spaced apart horizontally, the number of zones in the two sets being equal, one zone in each set corresponding to one zone in the other set; and means for selectively transmitting radiation that passes through each zone in each set through the corresponding zone in the other set, said last mentioned means comprising first deflection means located at said first image area for horizontally deflecting radiation passing through the respective horizontally extending zones by such amounts that such radiation passing through said first image area and through each horizontally extending zone also passes through the corresponding vertically extending zone, and second deflection means located at said second image area for vertically deflecting radiation passing through the respective vertically extending zones by such amounts that such radiation passing through said second image area and through each vertically extending zone also passes through the corresponding horizontally extending zone.

11. In an optical system as defined in claim 10 comprising a monochromator defining one of said regions, said monochromator having two spaced apart beam-limiting elements that define the limits of the beam of radiation that is transmitted both through said first region and through said second region.

12. In a spectrometer, means for supporting a tube for holding a sample in a sample region with the axis of the tube arranged along an optic axis; a double monochromator having an entrance slit and an exit slit and an intermediate slit and comprising one monochromator section including a first dispersing element, operatively arranged between said entrance slit and said intermediate slit, and comprising a second monochromator section, including a second dispersing element, operatively arranged between said intermediate slit and said exit slit; imaging means for collecting radiation that emerges from said sample along said optic axis and through one end of said tube and for transmitting such radiation through said entrance slit and toward said first dispersing element, the angle over which such radiation is transmitted from said sample being so large in any plane and the length of the sample that is illuminated by exciting radiation being so long that such transmitted radiation includes radiation scattered by a sample in such tube and multiply-reflected at the walls of said tube; and means responding to the intensity of radiation emerging from said exit slit.

13. In a spectrometer, means for supporting a sample for analysis in a sample region on an optic axis, said sample emitting radiation; a multiple slit monochromator having a plurality of parallel entrance slits and having a dispersing element arranged to form spectra of heterchromatic radiation entering said entrance slits, said monochromator having a first principal plane parallel to the lengths of said slits and having a second principal plane parallel to the widths of said slits, the length of said slits being large compared to the widths of said slits, the beam transmitted by each entrance slit and said dispersing element being characterized by a maximum Lagrange aperture constant in said first principal plane that is large compared with the maximum Lagrange aperture constant in said second principal plane; and imaging means comprising a Lagrange-constant transformer for collecting radiation that emerges from said sample along said optic axis and for transmitting such radiation through said entrance slits and toward said dispersing element, the beam of radiation so transmitted from the sample through each entrance slit being characterized in the sample region by maximum Lagrange aperture constants in said two planes that have a low ratio, all of said beams having a common aperture stop in said monochromator and passing through a common aperture stop image in said sample region.

14. In a spectrometer, means for supporting a sample for analysis in a sample region on an optic axis, said sample emitting radiation; a multiple slit monochromator having a plurality of parallel entrance slits and having a dispersing element arranged to form spectra of heterochromatic radiation entering said entrance slits, said monochromator having a first principal plane parallel to the lengths of said slits and having a second principal plane parallel to the widths of said slits, the length of said slits being large compared to the widths of said slits, the beam transmitted by each entrance slit and said dispersing element being characterized by a maximum Lagrange constant in said first principal plane that is large compared with the maximum Lagrange constant in said second principal plane; and imaging means for collecting radiation that emerges from said sample along said optic axis and for transmitting such radiation through said entrance slits and toward said dispersing element, the beam of radiation so transmitted from the sample through each entrance slit being characterized in the sample region by maximum Lagrange constants in said two planes that have a low ratio, said imaging means comprising a Lagrange constant transformer for forming at the respective entrance slits substantially coextensive images by means of such radiation that emerges from said sample region through a plurality of adjacent corresponding areas therein and for forming within said monochromator images of a common area lying in said sample region through which said radiation is transmitted to both entrance slits, said latter images forming zones that extend in the direction of said second principal plane but are spaced apart in the direction of said first principal plane.

References Cited in the file of this patent

UNITED STATES PATENTS

| | | |
|---|---|---|
| 1,716,756 | Benford | June 11, 1929 |
| 2,021,162 | Walton | Nov. 19, 1935 |
| 2,121,568 | Newcomer | June 21, 1938 |
| 2,627,199 | O'Brien | Feb. 3, 1953 |
| 2,749,793 | White | June 12, 1956 |

OTHER REFERENCES

"The Optical Image Transformer," Benesch et al., pages 252–254 in Journal of the Optical Society, volume 41, April 1951.